(12) United States Patent
Taylor et al.

(10) Patent No.: US 6,375,089 B1
(45) Date of Patent: Apr. 23, 2002

(54) MULTIPLE SPRAYER ASSEMBLY AND METHOD FOR USE

(75) Inventors: Robin A. J. Taylor, Wooster, OH (US); Andrew Charles Chapple, Hattersheim (DE)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 09/504,055

(22) Filed: Feb. 14, 2000

(51) Int. Cl.$^7$ ............................................... B05B 17/00
(52) U.S. Cl. ........................... 239/1; 239/164; 239/159; 239/172; 239/176; 239/420; 239/422; 239/428
(58) Field of Search ............................ 239/1, 159, 164, 239/166, 169, 170, 172, 176, 418, 420, 422, 428, 433, 543, 536, 548, 549, 566, 283, 282; 248/75, 291.1

(56) References Cited

PUBLICATIONS

Adams, A.J. & Hall F.R. (1990) Initial behavioural responses of *Aphis gossypii* to defined deposits of bifenthrin on chrysanthemum. Crop Protection 9: 39–43.

Adams, A.J., Chapple A.C. & Hall F.R. (1990) Droplet spectra for some agricultural fan nozzles, with respect to drift and biological efficiency. Pp. 156–169 in Pesticide Formulations and Application Systems: Tenth Symposium. ASTMSTP1078. (Eds. L.E. Bode, J.L. Hazen & D.G. Chasin) American Society for Testing and Materials, Philadelphia, PA.

Anonymous. (1990) Beneath The Bottom Line: Agricultural Approaches to Reduce Agrichemical Contamination of Groundwater. Summary. Office of Technology Assessment, Congress of The United States, Publication OTA–F–417, 337pp.

Anonymous. (1992) Incentives for Development and Registration of Reduced Risk Pesticides. Federal Register, Part VIII, Environmental Protection Agency (Jul. 20, 1992) [OPP–36184; FRL 4006–7] 157(139): 32140.

(List continued on next page.)

*Primary Examiner*—Lesley D. Morris
*Assistant Examiner*—Christopher S. Kim
(74) *Attorney, Agent, or Firm*—Standley & Gilcrest LLP

(57) ABSTRACT

A multiple nozzle sprayer that includes a fixed or swing bracket assembly configured with a mounting bracket fixedly or adjustably attached by at least one pivot pin to an outwardly projecting angle arm. The mounting bracket is formed with a mounting pad, and the mounting bracket and the angle arm are each formed with at least one nozzle mounting portion. Also included are first and second nozzles mounted to the nozzle mounting portions and configured to project respective spray clouds to intersect. The first nozzle spray cloud is configured with a predetermined droplet size spectra that is greater than that of the second spray nozzle. The first nozzle can be further configured to spray a cloud of a carrier fluid and the second nozzle can be configured to spray an active fluid in a spray cloud that combines with the carrier fluid spray cloud. In another variation, the carrier fluid is water and the active fluid is selected from a group of biologically and/or chemically active substances, and/or mixtures thereof. In a further variation, the carrier fluid is the same as the active fluid, or is a mixture of water and the active fluid. The present invention also contemplates the preceding variations wherein the volumetric flow rate and spray patterns are adjustable through using interchangeable and/or adjustable nozzles. Further, a single nozzle is contemplated that is configured with multiple sprayers. Also, multiple sprayers are contemplated that include two or more nozzles that are each configured to project intersecting spray clouds.

23 Claims, 6 Drawing Sheets

OTHER PUBLICATIONS

Arnold, A.J., Cayley G.R., Dunne Y., Etheridge P., Griffiths D.C., Phillips F.T., Pye B.J., Scott G.C. & Vojvodic P.R. (1984) Biological effectiveness of electrostatically charged rotary atomisers. I. Trials on field beans and barley. Annals of Applied Biology 105: 353–359.

Arnold, A.J., Cayley G.R., Dunne Y., Etheridge P., Griffiths D.C., Jenkyn J.F., Phillips F.T., Pye B.J., Scott G.C. & Woodcock C.M. (1984) Biological effectiveness of electrostatically charged rotary atomisers. II. Trials with cereals, 1982. Annals of Applied Biology 105: 361–367.

Arnold, A.J., Cayley G.R., Dunne Y., Etheridge P., Greenaway A.R., Griffiths D.C., Phillips F.T., Pye B.J., Rawlinson C.J. & Scott G.C. (1984) Biological effectiveness of electrostatically charged rotary atomisers. III. Trials on arable crops other than cereals, 1982. Annals of Applied Biology 105: 369–377.

Chapple, A.C. (1993) Dose transfer of *Bacillus thuringiensis* to the diamondback moth (Lepidoptera: Plutellidae) via cabbage: a synthesis. PhD Thesis, Department of Entomology, OARDC, Ohio State University, Ohio, USA.

Chapple, A.C., Downer, R.A. & Hall F.R. (1994) Effects of spray adjuvants on swath patterns and drop spectra for a flat–fan nozzle. Crop Protection 12: 579–590.

Chapple, A.C., Downer, R.A., Wolf, T.M., Taylor, R.A.J. & Hall, F.R. (1996) The application of biological pesticides: Limitations and a practical solution. Entomophaga 41, 465–474.

Chapple, A.C. & Hall F.R. (1994), A description of the droplet spectra produced by a flat–fan nozzle. Atomization and Sprays 3: 477–488.

Chapple, A.C., Hall F.R. & Bishop B.L. (1994) An assessment of single nozzle patternation and the extrapolation to moving booms. Crop Protection 12: 207–213.

Chapple, A.C., Taylor, R.A.J. & Hall, F. R. (1995) The transformation of spatially determined drop sizes to their temporal equivalents for agricultural sprays. Journal of Agricultural Engineering Research 60, 49–56.

Chapple, A.C., Taylor, R.A.J., Hall, F.R. & Downer, R.A. (1994) Understanding the dose transfer process as a prerequisite to a more predictable lab–to field performance correlation. BCPC Monograph 59: 267–272.

Chapple, A.C., Wolf, T.M., Downer, R.A., Taylor, R.A.J. & Hall, F.R. (1997) Use of nozzle–induced air–entrainment to reduce active ingredient requirements for pest control. Crop Protection 16, 323–330.

Cooke, B.K., Hislop E.C., Herrington P.J., Western N.M., Jones K.G., Woodley S.E. & Chapple A.C., (1986), The physical, chemical, and biological appraisal of alternative spray techniques in cereals. Crop Protection 5: 155–164.

Crease, G.J., Hall F.R. & Thacker J.R.M. (1991), Reflection of agricultural sprays from leaf surfaces. Journal of Environmental Science Health B26: 383–407.

Dorr, G.J. & Pannell D.J. (1992) Economics of improved spatial distribution of herbicide for weed control in crops. Crop Protection 11: 384–391.

Downer, R. A., Taylor, R. A. J., Thompson, R. S., Ebert, T. A. & Hall, F. R. (1998) Qualitative properties of spray deposits—Patterns and statistics. Pp. 80–94 in Pesticide Formulations and Application Systems: 18th Volume—ASTM STP 1347 (Eds. J. D. Nalawaja, G. R. Goss & R. S. Scott). American Society for Testing and Materials, Philadelphia, PA.

Frick, E.L. (1970) The effects of volume, drop size and concentration, and their interaction, on the control of apple powdery mildew by Dinocap. BCPC Monograph 2: 23–33.

Graham–Bryce, I.J. (1983) Pesticide Research for the Improvement of Human Welfare. Pp. 21–42 in Pesticide Chemistry: Human Welfare and the Environment. vol. 1. Synthesis and Structure–Activity Relationships. (Eds. P. Doyle & T. Fujita), Pergamon Press, Oxford, UK.

Hall F.R. & Adams, A.J. (1990) Microdroplet application for determination of comparative topical and residual efficacy of formulated permethrin to two populations of diamondback moth (*Plutella xylostella* L.). Pesticide Science 28: 337–343.

Hall, F.R., Chapple, A.C., Taylor, R.A.J. & Downer, R.A. (1994) Dose transfer of Bt from cabbage to the diamondback moth: a graphical simulator. Journal of Environmental Science Health B29: 661–678.

Hall, F. R., Chapple, A.C., Taylor, R.A.J. & Downer, R.A. (1995) Modeling the dose acquisition process of Bt: The influence of feeding pattern on survival. Pp. 68–78 in Biorational Pest Control Agents: Formulation and Delivery (Eds. F. R. Hall & J. W. Barry) ACS Symposium Series 595, American Chemical Society, Washington, DC.

Hall, F. R., Downer, R. A., Wolf, T. M. & Chapple, A.C. (1996) The "double nozzle"—a new way of reducing drift and improving dose transfer. Pp. 114–126 in Pesticide Formulations and Application Systems: 18th Volume—ASTM STP 1347 (Eds. M. J. Hopkinson, H. M. Collins & G. R. Goss). American Society for Testing and Materials, Philadelphia, PA.

Hall, F. R., Taylor, R. A. J. & Chapple, A. C. (1998) Termination Report to The U.S. Dept. of Agriculture Cooperative State Research Service, Grant No. 94–37313–0679, A New Pesticide Delivery System to Reduce Environmental Contamination. Laboratory for Pest Control Application Technology (LPCAT), Ohio Agricultural Research and Development Center (OARDC), 1680 Madison Avenue, Wooster, Ohio, 44691, U.S.A.

Hislop, E.C. (1987) Can we define and achieve optimum pesticide deposits? Aspects of Applied Biology 14: 153–165.

Hislop, E.C. (1989) Crop spraying under controlled conditions. In Comparing Laboratory and Field Pesticide Performance. Aspects of Applied Biology 21: 119–120.

Kirchner, L.M., Taylor, R.A.J., Downer, R.A. & Hall, F.R. (1996a) Calibrating the pesticide capture efficiency of passive dosimeters. Pesticide Science 46, 61–69.

Kirchner, L.M. Taylor, R.A.J., Downer, R.A. & Hall, F.R. (1996b) Comparison of the pesticide capture efficiency of potential passive dosimeter materials. Bulletin of Environmental Contamination and Toxicology 57, 938–945.

Pimentel, D., McLaugghlin L., Zepp A., Lakitan B., Kraus T., Kleinman P., Vancini F., Roach W.J., Graap E., Keeton W.S. & Selig G. (1991) Environmental and economic effects of reducing pesticide use. BioScience 41: 402–409.

Ratcliffe, S.L. & Yendol, W.G. (1993) Lethal dose and associated effects of *Bacillus thuringiensis* in sprayed droplets against gypsy moth (Lepidoptera: Lymantridae). Journal of Environmental Science Health B28: 91–104.

Reichard, D.L. (1988) Drop formation and impaction on the plant. Weed Technology 2: 82–87.

Roush, R.T. (1989) Designing resistance management programs: how can you choose? Pesticide Science 26: 423–441.

Salt, D.W. & Ford, M.G. (1993) The kinetics of insecticide action. Part V: Deterministic models to simulate the movement of pesticide from discreet deposits and to predict optimum deposit characteristics on leaf surfaces for the control of sedentary crop pests. Pesticide Science 48: 77–87.

Taylor R.A.J., Chapple, A.C. & Hall F.R. (1993) A simulation model of the dose transfer of foliar applied insecticides. Pp. 242–255 in Pesticide Formulations and Application Systems: 13th Volume, ASTM STP 1183. (Eds. P.D. Berger, B.N. Devisetty & F.R. Hall) American Society for Testing and Materials, Philadelphia, PA.

Winfield R.G. (1989) Toward More Efficient Field Application of Pesticides., Report, Ridgetown College of Agricultural Technology, Ridgetown, Ontario, Canada.

Ebert, Timothy A., Taylor, R. A.J., Downer, Roger A. & Hall, Franklin R. (1999) Deposit structure and efficacy of pesticide application. 2: *Trichoplusia ni* control on cabbage with fipronil. Society of Chemical Industry. Pestic Sci 0031–613X/99.-

MULTIPLE SPRAYER ASSEMBLY AND METHOD FOR USE

This invention was made with U.S. Government support under Contract Grant No. 94-37313-0679 awarded by The United States Department of Agriculture, Cooperative State Research Service, to the Laboratory for Pest Control Application Technology (LPCAT) at the Ohio Agricultural Research and Development Center (OARDC) on the Ohio State University campus in Wooster, Ohio 44691. Accordingly, the U.S. Government has certain rights in this invention.

BACKGROUND OF THE INVENTION

1. Technical Field of the Invention

The present invention is directed to improved devices and methods to optimize the efficacy of biologically and/or chemically active ingredients that are applied to agricultural products and crops during the growing process, including without limitation indoor and outdoor broad-acre crops, orchards, trees, vines, nursery plants, and row crops, or to any surface or volume where pest growth control is effected using various types of nozzles and spray clouds. Active ingredients typically include, for example but not for purposes of limitation, biologically and/or chemically active biologicals, biorationals, and substances such as agrochemicals that include, for purposes of example without limitation, herbicides, insecticides, fungicides, and their safeners (or antidotes), and other biocides including biological pesticides, plant growth regulators, and bactericides, and including such pest control agents such as fungi, bacteria, viruses, and pheromones and/or other semiochemicals that disrupt populations rather than kill individual organisms.

2. Background

The agriculture, horticulture, and public health application of sprayed substances having biologically and/or chemically active ingredients ("AI"), such as agrochemical pesticides has been effected with extremely poor efficiency. See, for example, Graham-Bryce I. J., Pesticide Research for the Improvement of Human Welfare. In Pesticide Chemistry: Human Welfare and the Environment. Volume 1. Synthesis and Structure-Activity Relationships. (Eds. P. Doyle & T. Fujita), Pergamon Press, Oxford, 1983 (hereafter "Graham-Bryce 1983"). In part, this is because macro-targets such as fields, orchards, trees, vines, nursery plants, and row crops usually have to be treated as a whole, whether or not individual small areas support weeds or crop plants that are infected with pests or pathogens. See, Hislop E. C., Can we define and achieve optimum pesticide deposits?, Aspects of Applied Biology 14: 153–165, 1987 (hereafter "Hislop 1987"). Even when an insecticide, for example, is deposited on an infested plant, the pest accumulates little of the insecticide. See, Adams A. J. & Hall F. R., Initial behavioural responses of Aphis gossypii to defined deposits of bifenthrin on chrysanthemum, Crop Protection 9: 39–43, 1990 (hereafter "Adams & Hall 1990"). Even less reaches the susceptible site within the organism. See, Graham-Bryce 1983, Hall F. R. & Adams A. J., Microdroplet application for determination of comparative topical and residual efficacy of formulated permethrin to two populations of diamondback moth (*Plutella xylostella* L.), Pesticide Science 28: 337–343, 1990 (hereafter "Hall & Adams 1990"); and Ratcliffe, S. L. & Yendol, W. G., Lethal dose and associated effects of Bacillus thuringiensis in sprayed droplets against gypsy moth (Lepidoptera: Lymantridae), Journal of Environmental Science Health B28: 91–104, 1993 (hereafter "Ratcliffe & Yendol 1993").

Estimates vary as to how much of the pesticide sprayed actually reaches its intended target and results in pest mortality, which is sometimes also referred to as "application efficiency". Application efficiencies are very poor and typically range from about 1% for some broad-spectrum post-emergent foliar-applied herbicides to much lower estimates. This means that about 99% of the biocide is wasted during the application spray process. See, for example, Graham-Bryce 1983, and Chapple, A. C., Wolf, T. M., Downer, R. A., Taylor, R. A. J. & Hall, F. R., Use of nozzle-induced air-entrainment to reduce active ingredient requirements for pest control. Crop Protection 16, 323–330, 1997 (hereafter "Chapple et al. 1997"). An even more distressing example shows a less than 0.001% application efficiency for the insecticide permethrin, which fares two-orders of magnitude worse when applied against diamond-back moth larvae, a worldwide pest of cabbage and other Cruciferae. See, Hall & Adams 1990.

An improved application system would apply the exact quantity of pesticide required to kill the weed, insect, or pathogen targets in the field. With application efficiencies <1% for the vast majority of application scenarios, there is considerable room for improvement, with attendant reductions in environmental and health risks, and producer costs. Little has been achieved to overcome the inefficiencies in the application process, although reduction of total AI applied by selective treatment of small pest-infested areas, so-called precision agriculture, is currently an active area of research. An alternative approach that reduces the application rate is to improve the efficiency of delivery of pesticides to the pests.

Even when plants are targeted individually, much of the spray directed at them often fails to be retained. See, Cooke B. K., Hislop E. C., Herrington P. J., Western N. M., Jones K. G., Woodley S. E. & Chapple A. C., The physical, chemical, and biological appraisal of alternative spray techniques in cereals. Crop Protection 5; 155–164, 1986 (hereafter "Cook et al. 1986"); and Salt, D. W. & Ford, M. G., The kinetics of insecticide action, Part V: Deterministic models to simulate the movement of pesticide from discreet deposits and to predict optimum deposit characteristics on leaf surfaces for the control of sedentary crop pests. Pesticide Science, 1993 (hereafter "Salt & Ford 1993"). Instead, it contaminates the soil, or drifts from the area, or both. When a fraction of the spray does land on the target plant, its spatial distribution may be sub-optimal for the desired biological effect. The excess insecticide is not only wasted, it enters the environment as contamination and may contribute to resistance: exposure to sub-lethal doses of insecticides is thought to be a contributory factor in the development of insecticide resistance. See, Rousch, T. T., Designing resistance management programs: how can you choose?, Pesticide Science 26: 423–441, 1989 (hereafter "Rousch 1989").

Preliminary attempts have been made to accomplish the results achieved by the present invention and are described by various authors. See, Hall, F. R., Downer R. A., Wolf T. M., and Chapple A. C., The "Double Nozzle" A New Way of Reducing Drift and Improving Dose-Transfer?, In *Pesticide Formulations and Application Systems: Sixteenth Symposium*, ASTM STP 1312 eds. M. J. Hopkinson, H. M. Collins, and G. Robert Goss, pp. 114–12, American Society for testing and Materials, Philadelphia, USA, 1996 (hereafter, Hall et al. 1996); Hall, F. R., Taylor, R. A. J. & Chapple, A. C., Termination Report to The U.S. Dept. of Agriculture Cooperative State Research Service, Grant No. 94-37313-0679, A New Pesticide Delivery System to Reduce Environmental Contamination, Laboratory for Pest Control Application Technology (LPCAT), Ohio Agricultural Research and Development Center (OARDC), 1680 Madison Avenue, Wooster, Ohio, 44691, U.S.A., 1998 (hereafter, Hall et al. 1998).

What has been needed but heretofore unavailable is a device that improves the present state of the art of spraying biocides on various agricultural products, surfaces, or into volumes, that increases the effectiveness of the treatment. Also, the device must be compatible for use with widely employed agricultural equipment such as mobile spraying units that incorporate platforms having folding, deployable, and stowable booms. Such spraying units are typically self-propelled or propelled using tractors and other motorized vehicles.

SUMMARY OF THE INVENTION

In developing the device according to the present invention, a detailed study of the deposit quality has been accomplished to determine the precise arrangement of components needed to improve the state of the art as previously described. Accordingly, what has been needed but heretofore unavailable is a device such as the present invention that can significantly improve the deposit quality and the dose transfer.

In one preferred embodiment of the present invention, a multiple nozzle sprayer includes a fixed or swing bracket assembly, or a sprayer bracket assembly, that is configured with a mounting bracket adjustably attached by at least one pivot pin to an outwardly projecting angle arm, the mounting bracket formed with a mounting pad, such as a flat plate, a U-type bolt, or equivalent structure, and the mounting bracket and the angle arm each formed with at least one nozzle mounting portion. Also included are first and second nozzles mounted to the nozzle mounting portions and configured to project respective intersecting spray clouds. The first nozzle spray cloud is configured with a predetermined droplet size frequency distribution (hereafter also referred to as "droplet spectra") that is greater than that of the second spray nozzle.

In a variation of this embodiment, the angle arm is releasably and stowably attached to the mounting bracket. The first nozzle can be further configured to spray a cloud of a carrier fluid and the second nozzle can be configured to spray an active fluid or ingredient in a spray cloud that combines with the carrier fluid spray cloud. The first nozzle is also referred to as a carrier sprayer and the spray cloud of carrier fluid is also referred to as a carrier spray. Similarly, the second nozzle is also referred to as an active sprayer and the spray cloud of the active ingredient is also referred to as an active spray.

In another variation, the carrier fluid is water and/or various types of surfactants and adjuvants. Active ingredients typically include, for example but not for purposes of limitation, biologically and/or chemically active biologicals, biorationals, and substances such as agrochemicals that include, for purposes of example without limitation, herbicides, insecticides, fungicides, and their safeners, and other biocides including biological pesticides, plant growth regulators, and bactericides, and including such pest control agents such as fungi, bacteria, viruses, and pheromones and/or other semiochemicals that disrupt populations rather than kill individual organisms, and/or a mixture of at least two elements of the group. Additionally, the surfactants and adjuvants, if used at all, may be added to either the carrier fluid, active fluid, or both.

The present invention also contemplates the preceding variations wherein the volumetric flow rate and spray patterns are adjustable through use of different, interchangeable and/or adjustable nozzles. Further, a single nozzle is contemplated that is configured with multiple sprayers and a multiple nozzle is contemplated that includes at least three or more nozzles. Also, the spray clouds may be adjusted as further described below wherein a majority of active spray droplets does not coalesce with the carrier spray droplets.

In another variation of the preceding embodiment, the respective nozzle spray patterns are adjusted so the active spray droplets are entrained in the airflow behind the larger carrier spray droplets and carried into the target canopy.

A different variation of the preceding embodiment incorporates at least one additional nozzle adapted to spray an additional cloud that intersects and combines with the carrier cloud, wherein the droplets of the additional cloud are entrained in the air flow behind the carrier droplets and whereby the majority of the additional spray droplets do not coalesce with the carrier droplets.

Another preferred variation of the preceding embodiments of the present invention is directed to a multiple nozzle sprayer that incorporates a swing bracket assembly, or a sprayer bracket assembly, that includes a mounting bracket adjustably attached by at least one pivot pin to an outwardly projecting angle arm, the mounting bracket formed with a mounting pad and the mounting bracket and the angle arm each formed with at least one nozzle mounting portion. The multiple nozzle sprayer is configured with carrier and active spray nozzles mounted to the nozzle portions and configured to project respective intersecting spray clouds that combine. Further, the carrier spray nozzle cloud has a droplet size spectra that exceeds that of the active spray nozzle cloud.

A variation of the preceding embodiment of a multiple nozzle sprayer is also practiced according to present invention and includes a swing bracket assembly, or a fixed sprayer bracket assembly, that has a mounting bracket adjustably attached by at least one pivot pin to an outwardly projecting angle arm, the mounting bracket formed with a mounting pad and the mounting bracket and the angle arm each formed with at least one nozzle mounting portion. This variation is further configured with first and second nozzles having respective and intersecting spray clouds, wherein the second nozzle spray cloud is configured with a droplet size spectra that is less than that of the first spray nozzle.

Another preferred variation of the previous embodiment teaches a multiple nozzle sprayer assembly that is adapted with a swing bracket assembly, or a sprayer bracket assembly, that includes a mounting bracket adjustably attached by at least one pivot pin to an outwardly projecting angle arm, the mounting bracket formed with a mounting pad and the mounting bracket and the angle arm each formed with at least one nozzle mounting portion. Also included is a means for adjustably mounting sprayer nozzles, and a coarse spray nozzle carried from the adjustable mounting means that has a spray cloud with a generally vertical direction. A fine spray nozzle is also mounted on the mounting means and projecting a spray cloud that intersects and combines with that of the coarse spray nozzle.

A multiple nozzle sprayer assembly is disclosed by a different variation that includes means for adjustably mounting sprayer nozzles that includes a swing bracket assembly, or a fixed sprayer bracket assembly, that having a mounting bracket adjustably attached by at least one pivot pin to an outwardly projecting angle arm, the mounting bracket formed with a mounting pad and the mounting bracket and the angle arm each formed with at least one nozzle mounting portion. This variation also includes a coarse spray nozzle movably carried from the mounting means and having a spray cloud with a generally vertical direction, and a fine spray nozzle adjustably mounted to the mounting means and projecting a spray cloud that intersects and combines with that of the coarse spray nozzle. The droplet size spectra and velocity profile of the fine spray cloud droplets are further configured so that droplets intersect and combine with the coarse spray cloud as the fine spray cloud droplets are entrained in the air flow behind the droplets of the coarse spray cloud without coalescing.

The present invention further contemplates a modified spray carrier for applying an optimized amount of an active spray to agricultural products, which includes a spray nozzle support that includes means for mounting a multiple sprayer assembly and including a swing bracket assembly, or a sprayer bracket assembly, with a mounting bracket adjustably attached by at least one pivot pin to an outwardly projecting angle arm, the mounting bracket formed with a mounting pad and the mounting bracket and the angle arm each formed with at least one nozzle mounting portion. The preceding embodiment also includes carrier and active spray nozzles each configured to project intersecting spray clouds to form a combined spray cloud.

In a variation of the preceding embodiment, the active spray nozzle projects a spray cloud with a droplet spectra that is smaller than that projected by the carrier spray nozzle such that the active spray droplets are entrained behind the carrier spray droplets. In another variation, the majority of the active spray droplets do not coalesce with the carrier spray droplets.

Another variation of earlier embodiments of the present invention includes a device for spraying a target with a plurality of sprays, which includes a nozzle device incorporating first and second sprayers adapted to spray intersecting and combining spray patterns of respective carrier and active spray clouds. The nozzle device is configured with a swing bracket assembly, or a fixed sprayer bracket assembly, including a mounting bracket adjustably attached by at least one pivot pin to an outwardly projecting angle arm, the mounting bracket formed with a mounting pad and the mounting bracket and the angle arm each formed with at least one nozzle mounting portion. Also, the first sprayer projects a carrier cloud having a droplet size spectra greater than that of the active sprayer whereby the smaller droplets of the active spray cloud become entrained in the air flow behind the carrier spray cloud droplets. In a variation of this embodiment, the majority of the active cloud droplets do not coalesce with the carrier cloud droplets during travel.

The present invention is also directed to a novel multiple nozzle sprayer configured with a pivotally configured swing bracket assembly, or a fixed sprayer bracket assembly, having a mounting bracket releasably attached by at least one pin to an outwardly projecting angle arm, the mounting bracket formed with a mounting pad and the mounting bracket and the angle arm each formed with at least one nozzle mounting portion. This sprayer also incorporates first and second nozzles mounted to the nozzle mounting portions and configured to project respective intersecting spray clouds. The first nozzle spray cloud has a predetermined droplet size spectra that is greater than that of the second spray nozzle.

A sprayer boom is also within the metes and bounds of the present invention and includes a boom assembly configured with at least one swing bracket assembly, or a sprayer bracket assembly, that has a mounting bracket releasably attached by at least one pin to an outwardly projecting angle arm, the mounting bracket formed with a mounting pad and the mounting bracket and the angle arm each formed with at least one nozzle mounting portion. Here again the sprayer boom also includes first and second nozzles mounted to the nozzle mounting portions and configured to project respective intersecting spray clouds. The first nozzle spray cloud has a predetermined droplet size spectra that is greater than that of the second spray nozzle.

A system for spraying a target region is contemplated by the present invention and includes a supply of a carrier fluid and a supply of an active ingredient, both connected to a pressurizing source that supplies pressurized fluid to a boom assembly configured with at least one swing bracket assembly, or a sprayer bracket assembly. The swing bracket assembly, or sprayer bracket assembly, is configured with a mounting bracket releasably attached by at least one pin to an outwardly projecting angle arm, the mounting bracket formed with a mounting pad and the mounting bracket and the angle arm each formed with at least one nozzle mounting portion. First and second nozzles are each connected to one of the pressurized supplies and mounted to the nozzle mounting portions and configured to project respective intersecting spray clouds. The first nozzle spray cloud has a predetermined droplet size spectra that is greater than that of the second spray nozzle.

In another variation of the preceding embodiments, a system for spraying a target region includes pressurized supplies of a carrier fluid and an active ingredient that supply pressurized fluid to a boom assembly configured with at least one swing bracket assembly, or sprayer bracket assembly. The swing bracket assembly, or sprayer bracket assembly, is configured with a mounting bracket releasably attached by at least one pin to an outwardly projecting angle arm, the mounting bracket formed with a mounting pad and the mounting bracket and the angle arm each formed with at least one nozzle mounting portion. First and second nozzles are also included with each being connected to one of the pressurized supplies and mounted to the nozzle mounting portions. The nozzles are configured to project respective intersecting spray clouds wherein the first nozzle spray cloud has a predetermined droplet size spectra that is greater than that of the second spray nozzle.

Preferred modifications of embodiments of the present invention are also directed to a method for combining an active spray with a carrier spray. A step of the method includes selecting a swing bracket assembly, or a fixed sprayer bracket assembly, that includes a mounting bracket adjustably attached by at least one pivot pin to an outwardly projecting angle arm, the mounting bracket formed with a mounting pad and the mounting bracket and the angle arm each formed with at least one nozzle mounting portion. In another step, coarse and fine spray nozzles are selected that are carried from the swing bracket assembly, or sprayer bracket assembly, and configured to spray intersecting clouds that combine into an application spray cloud. The method further includes supplying the coarse spray nozzle with a carrier fluid and the fine spray nozzle with an active fluid and applying the combined spray cloud to a desired target.

In a variation of the preceding method, combining an active spray with a carrier spray also includes the step of selecting a swing bracket assembly, or a fixed sprayer bracket assembly, that includes a mounting bracket that is adjustably attached by at least one pivot pin to an outwardly projecting angle arm. The mounting bracket is formed with a mounting pad, and the mounting bracket and the angle arm are each formed with at least one nozzle mounting portion. Coarse and fine spray nozzles are also selected that are mounted on the swing bracket assembly, or sprayer bracket assembly. The nozzles project spray clouds having droplets with respectively predetermined droplet size spectra and velocity profiles so that the clouds intersect and combine as the fine spray cloud droplets become entrained in the air flow behind and follow the coarse spray cloud droplets.

Another variation of the preceding embodiments is directed to an improved method of applying an optimized amount of an active spray cloud to a target. In this variation, a swing bracket assembly, or a fixed sprayer bracket assembly, is selected that includes a mounting bracket adjustably attached by at least one pivot pin to an outwardly projecting angle arm. The mounting bracket is formed with a mounting pad, and the mounting bracket and the angle arm are each formed to include at least one nozzle mounting portion. An active spray nozzle is selected and mounted to the nozzle portion of the mounting bracket and has a spray cloud configuration with a predetermined droplet size spectra and velocity profile. Also, a carrier spray nozzle is selected and mounted to the nozzle portion of the angle arm. The carrier spray nozzle is configured to project a carrier spray that is coarser than the active spray cloud and that intersects and combines with the active spray cloud. Carrier and active fluids are supplied, respectively, to the carrier and active spray nozzles to apply the combined spray cloud to the target.

The multiple sprayer assembly and method for use of the present invention overcomes many of the shortcomings of the prior art technology by optimizing application of active substances to a target surface and by reducing the amount of active substances needed.

DESCRIPTION OF THE DRAWINGS

Without limiting the scope of the present invention as claimed below and referring now to the drawings, wherein like reference numerals across the several views refer to identical, corresponding, or equivalent parts:

DETAILED DESCRIPTION OF THE PREFERRED EMBODIMENTS

Figure 1:
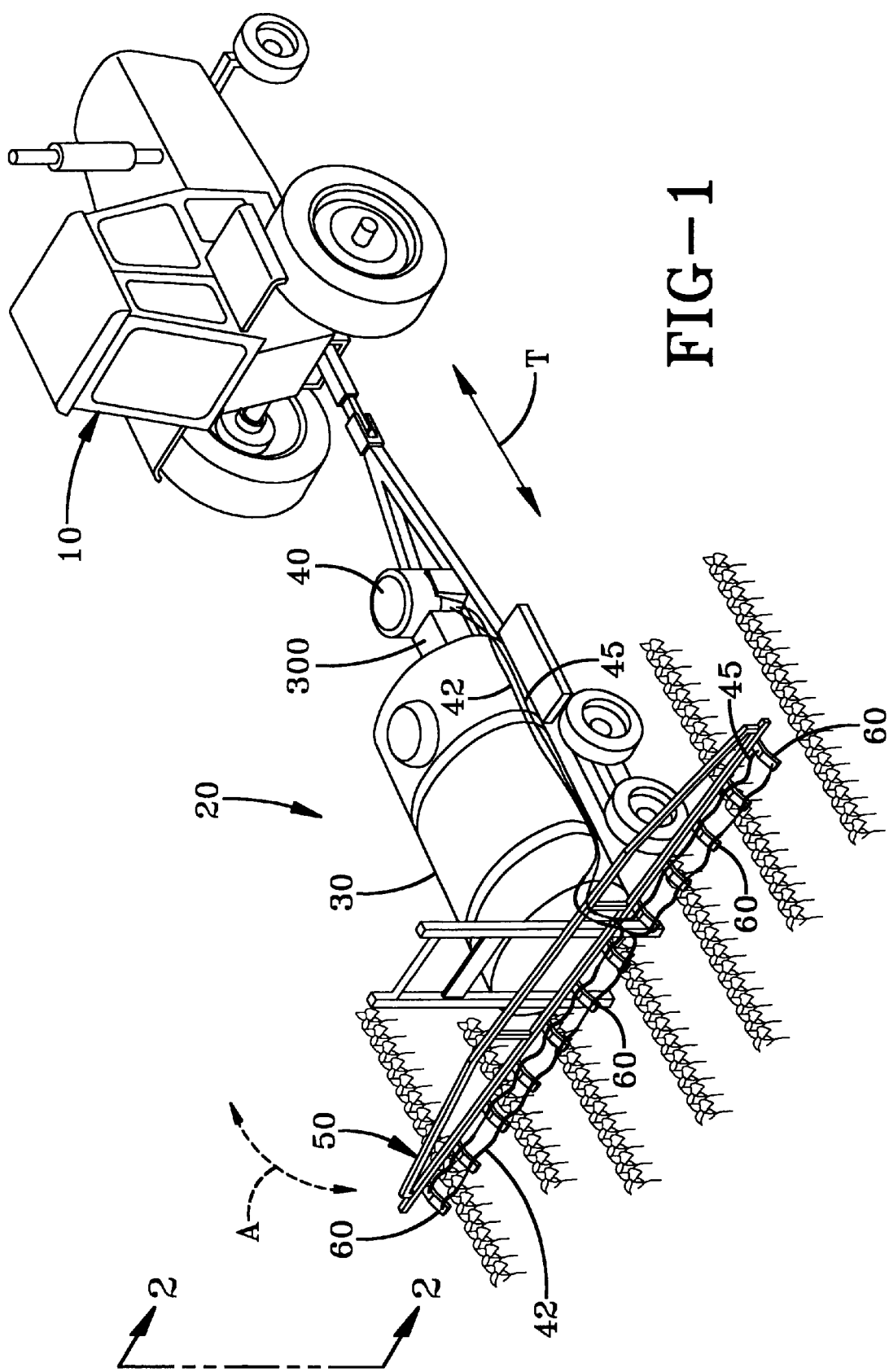
FIG. 1 is a perspective view of device embodying the present invention.

The following is a detailed description of a preferred embodiment of the proposed invention that is also considered to be the best mode. The application processes for applying bioactive and chemically active substances currently used in the US and throughout the world waste enormous quantities of AI. To date, no general system or formulation improvement has overcome this problem, largely due to a lack of relevant information and understanding, although some slight improvements using controlled droplet applicators (CDA) have been made in special circumstances where penetration of the canopy or target substrate is not required. See, for example, Arnold, A. J., Cayley G. R., Dunne Y., Etheridge P., Griffiths D. C., Phillips F. T., Pye B. J., Scott G. C. & Vojvodic P. R., Biological Effectiveness of Electrostatically Charged Rotary Atomisers, I. Trials On Field Beans And Barley, Annals of Applied Biology 105: 353–359, 1984; Arnold, A. J., Cayley G. R., Dunne Y., Etheridge P., Griffiths D. C., Jenkyn J. F., Phillips F. T., Pye B. J., Scott G. C. & Woodcock C. M., Biological Effectiveness of Electrostatically Charged Rotary Atomisers, II. Trials With Cereals, 1982, Annals of Applied Biology 105: 361–367, 1984; and Arnold, A. J., Cayley G. R., Dunne Y., Etheridge P., Greenaway A. R., Griffiths D. C., Phillips F. T., Pye B. J., Rawlinson C. J. & Scott G. C., Biological Effectiveness of Electrostatically Charged Rotary Atomisers, III. Trials On Arable Crops Other Than Cereals, 1982, Annals of Applied Biology 105: 369–377, 1984 (hereafter, "Arnold et al. 1984a,b,c"). Without such information and understanding of the agricultural spray application and deposit forming processes, the few successful attempts to improve pesticide use through atomization changes or through formulation/adjuvant changes were arrived at by trial and error. There is no general theory of the dose transfer process from which efficacy can be predicted from basic physico-chemical parameters.

The relationship between the structure of the spray cloud and the deposition pattern in a canopy is unknown. A deposit has two components: deposit quantity, which can be measured as mass per unit area, and deposit quality, which refers to the droplet deposit size distributions per unit area and their spatial distribution for a given area. The determination of the former is a relatively straightforward procedure (Cooke et al 1986). The latter is not. Even so, deposit quantity is a rough guide to the distribution of the AI through a canopy. However, a single 800 $\mu$m diameter droplet of a contact insecticide deposited on a leaf will give a biological result that is different from that resulting from the same volume of insecticide deposited as 512 independent 100 $\mu$m diameter droplets that are randomly or uniformly distributed on the substrate canopy. Even though deposit quality is a key component of the application process, there are almost no data concerning the quality of deposit in canopies.

In establishing a useful data set of droplet deposit quality for a target canopy, it is important to focus on what is termed "dose transfer." Dose transfer is defined as a qualitative measure of the entire process from atomization of the biocide to biological effect, including without limitation: atomization, transport to the target, impaction and retention, degradation and off-target fate of AI, dose acquisition, and biological effect on the target. To measure dose transfer, a biocide/pesticide delivery system (hereafter a "PDS") simulation model was created to analytically synthesize the biocide dose-transfer process. The PDS model was designed to run on a personal or desktop computer and to use some of the basic physico-chemical data of spray clouds as state variables. The model includes a graphical interface that enables the user to visualize the process of a simulated insect defoliator eating a leaf sprayed with an insecticide using, for purposes of illustration but not limitation, a device constructed according to the principles of the present invention.

The PDS model was extremely useful in the early stages of developing the various embodiments of the present invention to analyze the dose-transfer characteristics of variations of the embodiments. The PDS model has helped to identify some of the factors impeding attempts to improve spray application. The model also identified areas that may lead to further improvements. See, Chapple A. C., Dose Transfer of *Bacillus Thuringiensis* to the Diamondback Moth (Lepidoptera: Plutellidae) Via Cabbage: a synthesis. Ph.D. Thesis, Department of Entomology, Ohio Agricultural Research Center, Ohio State University, Ohio, USA, 1993 (hereafter "Chapple 1993"); Taylor, R. A. J., Chapple, A. C. & Hall, F. R., Simulation Model of the Dose Transfer of Foliar Applied Insecticides, pp. 242–255, Pesticide Formulations and Application Systems: 13th Volume—ASTM STP 1183 (Eds. P. D Berger, B. N. Devisetty, and F. R. Hall), American Society for Testing and Materials, Philadelphia, 1993 (hereafter "Taylor et al. 1993"); Hall, F. R., Chapple, A. C., Taylor, R. A. J. & Downer, R. A., Dose Transfer of *Bacillus Thuringiensis* from Cabbage to the Diamondback Moth: A Graphical Simulator, Journal of Environmental Science Health, B29:661–678, 1994 (hereafter "Hall et al. 1994"); and Hall, F. R., Chapple, A. C., Taylor, R. A. J. & Downer, R. A., Modeling the Dose Acquisition Process of Bt: The Influence of Feeding Pattern on Survival, pp. 68–78, Biorational Pest Control Agents: Formulation and Delivery (Eds. F. R. Hall & J. W. Barry), ACS Symposium Series 595, American Chemical Society, Washington, DC, 1995, (hereafter, "Hall et al. 1995").

The synthesis capability of the model highlighted important areas of consideration for developing a device according to the present invention that optimizes does transfer and application efficiency. These considerations are discussed in more detail in many of the references cited above. The data sets resulting from analysis of the model and the accompanying experimentation resulted in development of the biologically and/or chemically active substance application system of the present invention that incorporates two or more specially configured spray nozzles. The multiple nozzles are arranged so that one injects a cloud of very small droplets containing the AI, with or without adjuvant(s), into a cloud of larger droplets of either water or a water-adjuvant mix. The smaller AI droplets are thereby entrained in the airflow immediately behind the moving larger drops, which may be moving faster on average than the AI droplets.

The "nozzle" as the term is used here is intended to refer to and include any device used in agriculture, horticulture, public health, and other similar and related applications for atomizing and/or projecting a spray cloud containing active ingredients, including, for example but not limited to, non-hydraulic nozzles including, for example, foggers and spinning discs, as well as hydraulic nozzles that produce flat fan, full cone, hollow cone, and other types of spray clouds, including electrically and electrostatically charged and uncharged spray clouds and spray cloud droplets, whether charged or rendered neutral either directly or by induction, or by employing various electrohydrodynamic principles.

The multiple nozzle design includes any of a wide variety of commonly used sprayers and agricultural nozzles. A suitable nozzle is selected based upon the indicated "label rate" or "label application rate" specified by the manufacturer of the AI in accordance with U.S. Environmental Protection Agency ("EPA") specifications and specifications of other domestic and foreign agencies and entities. In light of those same specifications, the label and label application rates may be converted to a field application rate that may also be used to select a suitable nozzle. For purposes of illustration but not limitation, a first nozzle is selected that is configured with a medium-sized orifice to produce a "carrier spray" at conventional volumetric field rates of preferably between about 5 and 100 gallons per acre, and more preferably between approximately 8 and 50 gallons per acre, and even more preferably between about 10 and 25 gallons per acre, and most preferably about 20 gallons per acre."

A second nozzle is configured with a smaller orifice that produces an "active spray" cloud at reduced volumes rates compared to the first nozzle. Typically, the second nozzle is selected to produce an application rate that corresponds with the indicated label for the active ingredient or substance to be applied. The second nozzle is physically arranged below and to one side of the first nozzle and is configured to produce or project the atomized active ingredient (hereafter "AI"), or active spray cloud, and any combined adjuvants. The active spray is directed at an angle into the carrier spray cloud at a predetermined distance below the orifice of the carrier spray nozzle to optimize the entrainment of the smaller active spray droplets in the air flow behind the larger carrier spray droplets. Preferably, the carrier spray nozzle is directed to project its spray pattern in a generally downward direction. The AI spray nozzle is spaced apart from the carrier spray nozzle and is directed to project its spray into and at an angle to the carrier spray nozzle. Preferably, the active nozzle is arranged to spray in the direction of travel of the spray boom that supports the nozzle as it moves across the target substrate or canopy. This configuration allows the carrier spray cloud to recapture the active spray droplets that may pass through the carrier spray cloud (e.g., as indicated by the dashed arrow labeled "RE" in FIGS. 2 and 3). Recapture occurs because the carrier spray cloud is moving along with the spray boom in the direction of travel. In addition to recapture occurring due to transverse movement of the spray cloud, a certain amount of airflow draft is present that primarily surrounds the carrier spray cloud. The kinetic energy of the carrier spray cloud droplets is transferred in part to the surrounding, ambient air. This 'drafted' ambient air mass occurs proximate to the carrier spray cloud whereby the proximate ambient air is pulled into or drafted into the carrier spray cloud. The fluid flow field of the proximate drafted air imparts a kinetic energy or velocity vector to the active spray droplets that have passed completely through the carrier spray cloud, thereby effecting an added recapture mechanism.

As used herein, the terms "target," "substrate," "canopy," "plant," "crop," whether described in the plural or the singular, are intended to include all indoor and outdoor broad-acre crops, orchards, trees, vines, row crops, nursery plants, green-house plants, and other types of agricultural products regardless of how or where they are grown, maintained, treated, and/or harvested.

In alternative variations, and the active spray nozzle may be oriented relative to the carrier spray nozzle in any of a wide number of directions and configured with respect to orifice size and flow rate so as to reduce the amount of the active spray that passes through the carrier spray cloud. Similarly, in other variations, multiple additional nozzles may be selected, configured, and arranged relative to the carrier spray nozzle to produce additional, respective spray clouds that intersect with each other, the carrier spray cloud, or both in a similar fashion.

Although dependent upon the spray pattern characteristics of the selected nozzles, for proper entrainment, whereby the AI droplets become entrained in the air flow behind the carrier spray droplets, the angle found to be effective for purposes of the present invention is preferably approximately between 5 degrees and 90 degrees, and more preferably between approximately 10 degrees and 60 degrees, and even more preferably between approximately 15 degrees and 30 degrees, and most preferably approximately 30 degrees.

Preliminary investigations of the spray cloud produced by the multiple-nozzle system demonstrated that a fine spray nozzle containing AI that was configured to produce a flat fan spray pattern that was projected into the spray cloud projected from a relatively coarse carrier spray nozzle, which also projected a flat fan spray pattern, had strong potential to reduce AI application rates without loss in efficacy and without undesirable increased AI drift of the spray clouds. The data indicated that the combined spray, although containing far greater numbers of drops relative to the carrier spray alone, has very nearly the same velocity profile and therefore kinetic energy (hereafter "KE") as the coarse spray alone. The combined spray was found to have different deposition characteristics when compared to the characteristics of the coarser carrier spray nozzle used alone. The small droplets of the fine or active spray were found to have acquired KE from the larger droplets of the coarse spray nozzle. Thus, the smaller droplets of the fine AI spray nozzle impacted the target substrate plants more efficiently than the fine, active spray projected from the AI spray nozzle when used alone, without the combined carrier spray from the coarser nozzle.

With reference now to FIG. 1, an embodiment configured in accordance with the principles of the present invention is shown in operation. FIG. 1 shows a typical tractor 10 pulling or pushing a trailing spray cart 20 along a field of, for example without limitation, target substrate or plants to be sprayed. As mentioned earlier, the present invention may also be used in conjunction with treating all indoor and outdoor broad-acre crops, orchards, trees, vines, row crops, nursery plants, green-house plants, and other types of agricultural products regardless of how or where they are grown, maintained, treated, and/or harvested. The cart 20 includes, among other elements, one or more fluid tanks 30, 40 adapted to supply through hoses 42, 45 a plurality of fluids to a spray boom 50, which is configured with a plurality of multiple nozzle sprayers 60. As will be known to those with skill in the art, the boom 50 is adjustable to vary its height above the target plants. Additionally, although not reflected in detail in the drawings, the boom 50 may be stowed and deployed upwardly and downwardly in the direction indicated by arrows A—A for ease of transportation and storage. Similarly, the boom may also be stowed and deployed in a forwardly and rearwardly direction as well. Although a generally straight boom is shown in the figures, the multiple nozzle sprayer principles of the present invention are equally suitable to customized boom assemblies that are configured to spray a wide variety of various types of agricultural products. Additionally, the multiple nozzle sprayer is equally configurable for use with a wide selection of hand-carried, backpack- and knapsack-based sprayer applications.

Figure 2:
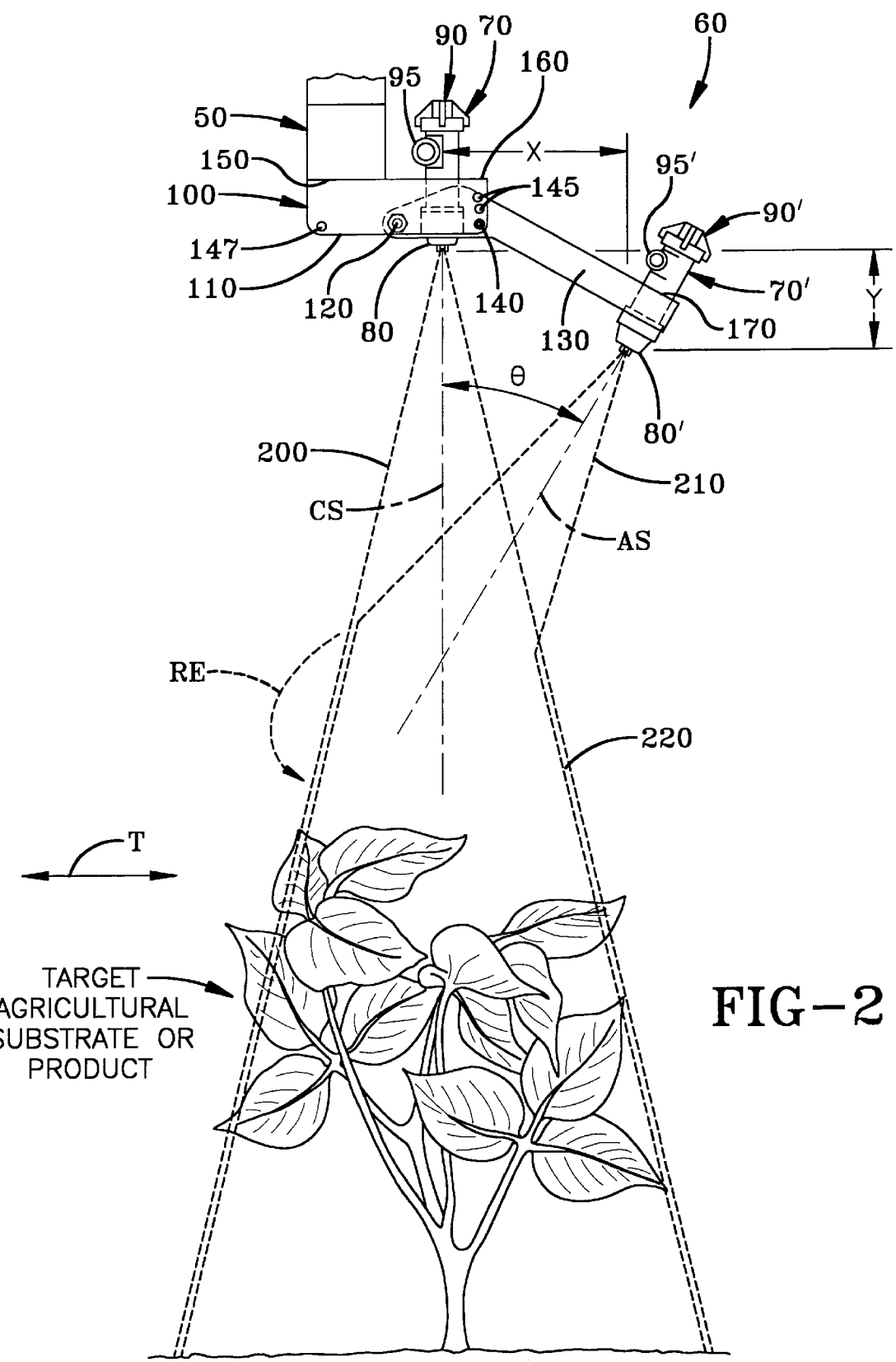
FIG. 2 is rotated side view of a multiple sprayer assembly of FIG. 1, in enlarged scale and taken along cross-sectional view line 2—2 of FIG. 1, showing the sprayer and spray patterns and with other structure removed for clarity.
Figure 3:
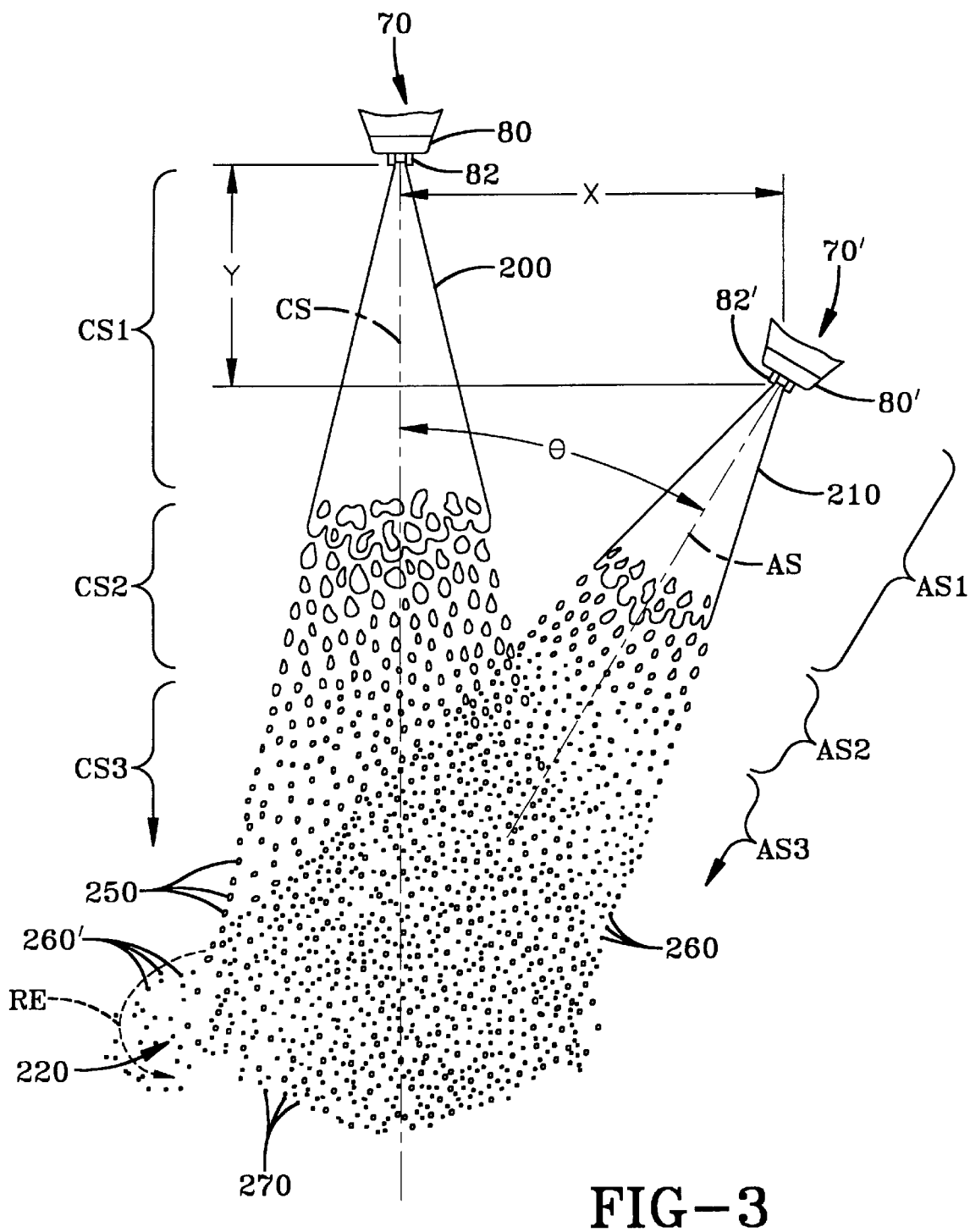
FIG. 3 is a detail view, in enlarged scale and taken along detail view line 3—3 of FIG. 2 showing the multiple nozzles and spray patterns of FIG. 2.
Figure 4:
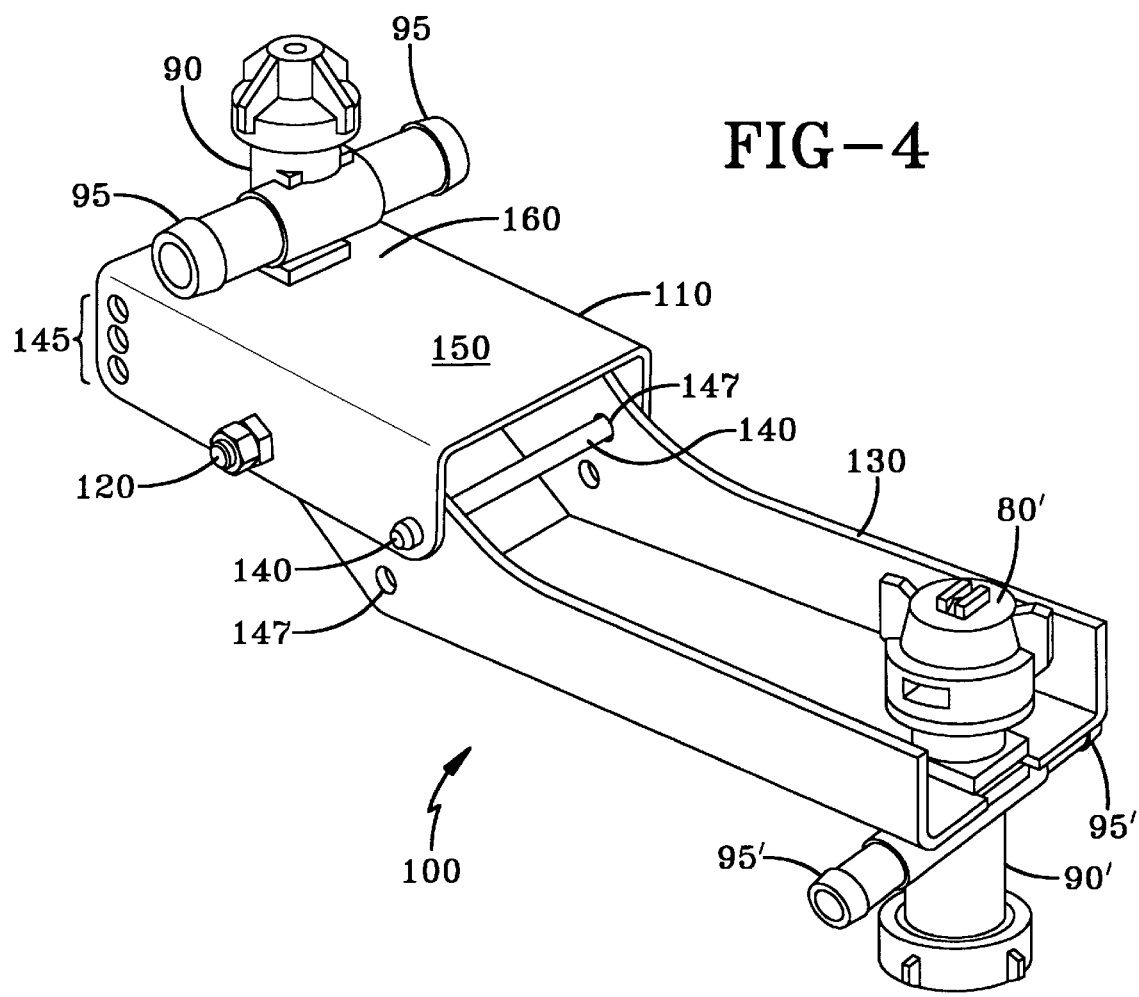
FIG. 4 is an elevated perspective view, in enlarged scale and rotated, of the sprayer assembly of FIGS. 1 and 2 in a stowed position.
Figure 5:
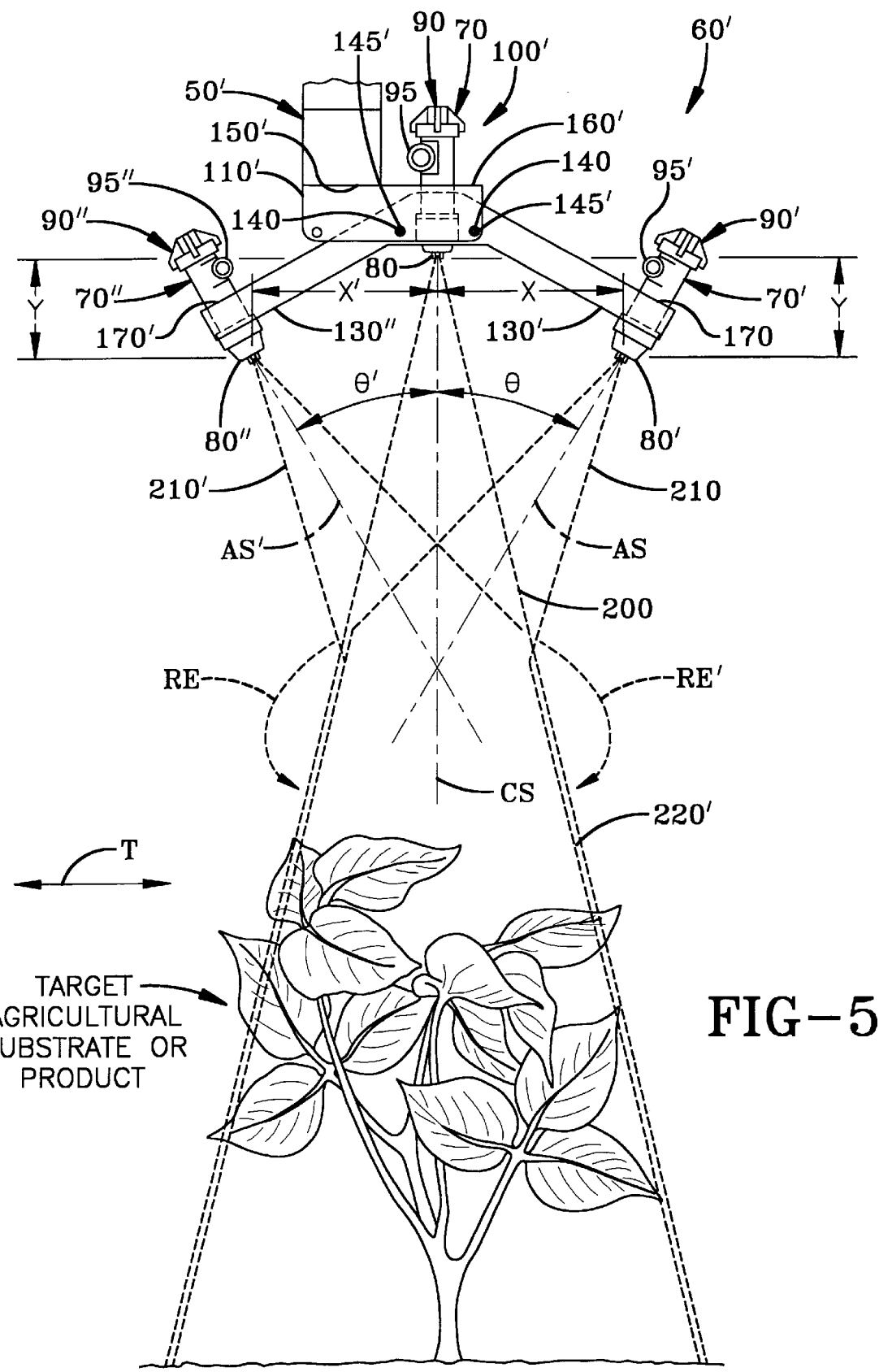
FIG. 5 is side view, in enlarged scale showing another embodiment of a multiple sprayer nozzle device according to the present invention.
Figure 6:
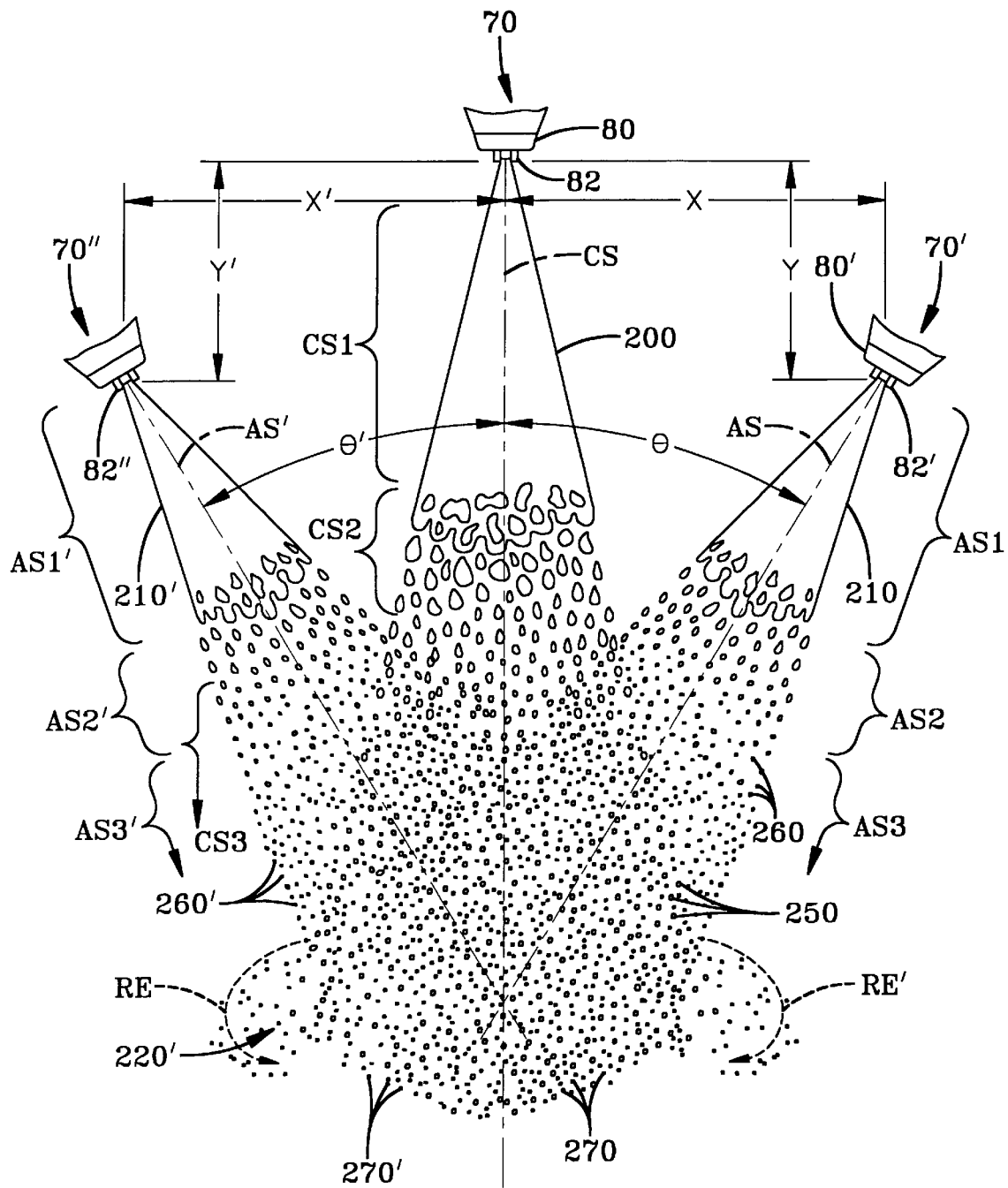
FIG. 6 is a detail view, in enlarged scale and taken along view line 6—6 of FIG. 5 showing the multiple nozzles and spray patterns of FIG. 5.

In the rotated and enlarged view of FIG. 2, taken along section lines 2—2 of FIG. 1, a more detailed view of one of the multiple nozzle sprayers 60 is shown. The sprayers 60 are configured for movement in the direction identified by the arrows labeled "T" across the various figures. For purposes of clarity, some structure of FIG. 1 has been removed in this view to illustrate the features of the multiple nozzle sprayer 60, and a section of the boom 50 is shown in cross-section. Although the multiple nozzle sprayer assembly 60 may also be constructed as an integrally formed single unit, not shown, it is described here in its constituent elements as shown in FIG. 2 for ease of explication. FIG. 3 is an enlarged detail view of the combining spray patterns in the region of FIG. 2 highlighted by brace 3—3, which is discussed more extensively in the following disclosure. FIG. 4 is an enlarged view of the multiple nozzle sprayer 60 shown in the stowed configuration as described in more detail below. FIGS. 5 and 6 describe an additional embodiment constructed in accordance with the principles of the present invention, which is described in more detail below.

The sprayer 60 includes a first carrier nozzle sprayer assembly 70 that includes a nozzle 80 and a nozzle feed support assembly 90 having supply hose fittings 95. The nozzle feed support assembly 90 is mounted to a swing bracket assembly, or a sprayer bracket assembly, 100 that is configured with a mounting bracket 110 that is fixedly attached to the boom 50. The mounting bracket 110 is adjustably and pivotally attached by at least one pivot pin 120 to an outwardly projecting angle arm 130. The mounting bracket 110 can also include other types of flat plates, a U-type bolt, or equivalent structure. The pivot pin 120 can be a bolt and nut combination or other equally suitable fastener device, such as a rivet type fastener. The angle arm 130 may be fixed in position relative to the mounting bracket 110 by use of a releasable fastener such as a removable pin 140.

The various figures show the pin 140 received in hole(s) 145 formed in the mounting bracket 110 and the angle arm 130. However, in the alternative, either multiple patterns of such holes 145 may also be formed or a curved slot may be formed, in addition to or in replacement of the holes 145, to allow an infinitely adjustably number of possible relative positions of the angle arm 130 and the mounting bracket 110. Also, as can be understood with reference to FIGS. 2 and 4, the removable pin 140 may be removed so that the angle arm 130 may be rotated from the deployed position of FIG. 2, about pivot pin 120, and re-positioned into the stowed configuration of FIG. 4. In alternative variations, the angle arm 130 may be positioned in any of the infinitely variable positions between the stowed and deployed positions. The alternative positions may be fixed by use of an appropriate fastening device, such as a bolt and a nut or equivalent device, that can be employed in conjunction with the hole patterns shown in the figures, or with slots and/or additional holes patterns, not shown in the drawings, but which can be formed in the apparatus shown. The desired positions of the swing bracket assembly, or sprayer bracket assembly, 100 and the relative nozzle arrangement can be selected to be compatible for use with any of the wide variety of spray boom configurations available and presently in use.

In the stowed configuration, the removable pin 140 can be inserted into holes 147 to fixedly position the angle arm 130. In the stowed configuration, the variations of the preferred embodiment of the present invention is most suitably compatible for use with existing spray boom equipment in wide use across various types of spray equipment. One problem overcome by this variation is that when in the stowed configuration represented by FIG. 4, the spray boom 50, as shown in FIG. 1 and described above, can be actuated into a stowed position without concern for whether the preferred embodiment will remain clear of other structural components already present on existing equipment. In other words, to be compatible for use with presently existing equipment, the present invention must not interfere with the operating envelopes of the spray boom 50 to which the multiple nozzle sprayers 60 are to be attached, whether as replacement hardware or as complementary hardware to the spray boom 50.

The mounting bracket 110 is formed with a mounting pad 150 that is mounted directly to the boom 50. In other variations, the mounting pad 150 can be attached to the boom with bolts, U-type bolts, clevis and tongue fittings, and the like. The mounting bracket 110 and the angle arm 130 are each formed, respectively, with at least one nozzle mount or mounting portion 160, 170. The first or carrier nozzle sprayer assembly 70 is mounted to the nozzle mount portion 160. The multiple nozzle sprayer 60 also includes a second or AI nozzle sprayer assembly 70' that includes a nozzle 80' and a nozzle feed support assembly 90' having supply hose fittings 95'. The AI nozzle feed support assembly 90' is mounted to the nozzle mount portion 170 of the angle arm 130.

As can be understood with continued reference to FIGS. 2 and 3, the active and carrier spray nozzles 80, 80' have respective orifices 82, 82' that are configured to project respective intersecting spray clouds 200, 210, which forms combined spray cloud 220. Each spray cloud 200, 210 respectively includes a generally centered center-line indicated in the figures as CS (to denote carrier spray) and AS (to denote active spray). As described previously, the nozzles 80, 80' are separated by an angle, denoted θ (theta) in the figures, whereby the respective spray clouds 200, 210 intersect to form a combined spray cloud 220. Additionally, the nozzle sprayer assemblies 70, 70' are arranged and spaced apart by distances X and Y, which must be selected based upon several factors including, in no particular order of priority or importance: (1) the type of agricultural product to be sprayed; (2) the distance from the multiple nozzle sprayer 60 to the target substrate of the agricultural target or product; (3) the operating pressures of the nozzles; (4) the spray cloud patterns of the nozzles 80, 80'; and (5) the type, composition, viscosity, surface tension, and flow rate of the carrier and AI fluids to be applied. Although the nozzles 80, 80' are shown positioned at an angle θ, where the medium-to-coarse, carrier spray cloud 200 is projected in a generally downward, vertical direction, alternative configurations are also suitable where both the carrier spray cloud 200 and the active spray cloud 210 are maintained at an angle that is offset from the generally vertical direction. In other words, both nozzles 80, 80' are arranged so that both nozzles project respective spray clouds 200, 210 at an angle offset from the vertical direction. In this variation, the nozzles 80, 80' are separated from one another by the preferred angle θ such that the centerlines CS, AS, and the respective intersecting spray clouds 200, 210, are configured to combine as described earlier.

This variation of earlier embodiments is especially well suited to applications of the present invention that incorporate two or more nozzles, for example, similar in configuration to nozzles 80, 80'. See, for example, FIGS. 5 and 6, which are described in more detail below. In this configuration, multiple nozzles are arranged to project respective spray clouds, such as conical spray clouds similar in some respects to intersecting spray clouds 200, 210, which are configured to form a combined spray cloud, similar to combined spray cloud 220, wherein smaller droplets are entrained in the wake behind larger, coarser, and faster-moving droplets. Those with skill in the art will recognize that various types of biologically and/or chemically active substances such as a variety of agrochemicals can not be mixed before spray application, but can only be mixed on the target substrate surface. This application requirement is especially prevalent in precision agriculture applications wherein global positioning equipment, computers, and software are used to apply such substances only where needed to address the various and multiple conditions that may be simultaneously present across a large amount of acreage. Such concurrently present conditions that must be treated can include a variety of pest infestations, soil nutrient deficiencies, and deficiencies of desirable biological organisms that may be needed for improved pollination. Use of the device of the present invention, which incorporates two or more nozzles, and whereby each nozzle can be intermittently and independently controlled, can more efficiently introduce needed substances in real-time, as, for example, tractor 10 pulls cart to move spray boom 50 across the target canopy.

Referring again to FIGS. 2 and 3, each of the respective spray clouds 200, 210 is configured with distinctly identifiable regions that exhibit characteristics important to accomplishing the desired combination of the clouds. As can be observed with reference to FIG. 3, carrier spray cloud 200 includes a sheeting region denoted "CS1," a transition region denoted "CS2," and an atomized region identified as "CS3." The active spray cloud 210 includes three similar regions respectively identified as regions "AS1," "AS2," and "AS3." The respective fluid passing through regions CS1 and AS1 has exited respective orifices 80, 82' in a sheet flow pattern that is in a dynamic vibrational state with an amplitude that is insufficient to overcome the internal surface tension of the respective fluids. However, as the respective fluids reach and pass through spray cloud regions CS2 and AS2, the vibrational amplitude increases and the respective fluid sheets begin to break up into droplets. The droplets continue to break up into even smaller droplets as they move downstream in the respective spray clouds as a result of internal kinetic energy having a magnitude that exceeds that surface tension of the respective fluid. The break up continues until equilibrium is reached between the internal kinetic energy of the droplets and the corresponding surface tension of the respective droplets. The vibrational amplitude and internal kinetic energy is a function of, among other factors, the mechanical configuration of the orifice and the head pressure at the exit plane of the orifice. The respective fluids reach equilibrium as they pass into regions CS3 and AS3. The larger carrier spray droplets 250 in region CS3 continue to accelerate downward under the force of gravity until a maximum speed is reached wherein the rate of acceleration of gravity equals the drag force exerted on the droplets 250 due to air friction. Since the active spray droplets 260 have a smaller droplet spectra, they lose their respective kinetic energy or forward velocity more quickly than the larger carrier spray droplets 250. Therefore, the spray clouds 200, 210 must intersect and combine after each of the respective fluids have fully transitioned to the CS3 and AS3 regions, but before the smaller droplets 260 of the active spray cloud 210 have lost the kinetic energy. If the spray clouds 200, 210 do not intersect and combine at the proper point, then active spray droplets 260 will drift about with only an unacceptably small fraction being entrained into the carrier spray cloud 200. Many specific configurations that accomplish certain aspects of the present invention are described with additional detail by Hall, F. R., et al. in their *Termination Report to The U.S. Dept. of Agriculture Cooperative State Research Service*, Grant No. 94-37313-0679, entitled A *New Pesticide Delivery System to Reduce Environmental Contamination*, Laboratory for Pest Control Application Technology (LPCAT), Ohio Agricultural Research and Development Center (OARDC), 1680 Madison Avenue, Wooster, Ohio, 44691, U.S.A., dated Dec. 21, 1998.

With reference again to FIG. 3, those with skill in the art will appreciate that the spray cloud 200 of the first carrier nozzle 80 is configured with a predetermined droplet 250 having a size spectra that is greater than that of the droplet size spectra of the droplet 260 of the spray cloud 210 of the second AI spray nozzle 80'. To achieve the relative, preferred droplet sizes, active and carrier spray nozzles 80, 80' are selected to meet the hydraulic operating constraints of the fluid supply pressure, volume flow rate, and physico-chemical properties such as viscosity and surface tension.

In an exemplary embodiment of the present invention, nozzle assemblies suitable for use with the present invention include those, for example and without limitation, commercially available under the "Quick TeeJet" trade name from the Spraying Systems Company of Wheaton, Illinois, which are described in more detail in U.S. Pat. Nos. 4,660,598 and 4,527,745; which patents are hereby expressly incorporated by reference herein in their entirety.

The multiple nozzle spray 60 was found to operate as desired using various "TeeJet" nozzles available from the Spraying System Company. The first or carrier spray nozzle 80 that was selected, which produced a relatively coarse "flat fan" type spray cloud 200, was the TeeJet model number XR8003VS, which was pressurized to 40 pounds per square inch (hereafter, "PSI") with water. The second or active ingredient nozzle 80' was the TeeJet model number XR800017 nozzle, which was pressurized at 50 PSI to project a fine "flat fan" type spray cloud of AI 210 that contained a biocide such as Ambush (also referred to in the industry as permethrin), which is available from Syngenta of Wilmington, Delaware, United States of America.

The sprayers 60 were arranged along the boom to be approximately evenly spaced apart a distance of preferably between about 5 inches and 40 inches, and more preferably between about 10 inches and 30 inches, and more preferably between approximately 15 inches and 25 inches, and most preferably about 20 inches. The active and carrier spray nozzles 80, 80' were selected to have a height above the agricultural target substrate or product to be sprayed that is preferably approximately between 5 inches and 60 inches, and more preferably between approximately 5 inches and 45 inches, and more preferably between approximately 10 inches and 25 inches, and most preferably approximately 20 inches. The nozzles 80, 80' were further arranged to preferably have a nozzle-to-nozzle resultant spacing of between about 0.10 inches and 10 inches, and more preferably approximately between 3 inches and 8 inches, and most preferably approximately 6 inches. This preceding arrangement is also established, with reference to the accompanying FIGS. 2 and 3, such that distance X is preferably approximately between about 0.05 inches and 11 inches, and more preferably approximately between 2.5 inches and 9 inches, and most preferably approximately 5 inches. Correspondingly, distance Y of FIGS. 2 and 3 should be preferably approximately between about 0.05 inches and 6 inches, and more preferably approximately between 1.5 inches and 4 inches, and most preferably approximately 3.5 inches. The nozzles 80, 80' were also spaced apart so that the angle θ of the center lines CS and AS of the respective spray clouds was preferably between about 5 degrees and 90 degrees, and more preferably between approximately 15 degrees and 45 degrees, and even more preferably approximately 30 degrees.

The preceding exemplary configuration, as shown in FIGS. 2 and 3, established that a significant reduction in the amount of AI needed to effect the desired efficacy could be achieved. For purposes of illustration but limitation, the arrangement can result in, among other benefits, a reduced drift of the AI spray cloud 210 when AI is reduced below 50% of the indicated label rate, and an equivalent efficacy that was only previously obtainable through application of far greater quantities of AI on the target agricultural substrate or product. Observation of the operating configuration also revealed that the combined spray cloud 220, while containing far greater numbers of drops 270 relative to the carrier spray cloud alone, had very nearly the same velocity profile, and therefore an equivalent kinetic energy (KE), as the coarse spray cloud 200 alone. Droplets 270 were found to be primarily active spray droplets 260, which had acquired KE from entrainment in the air flow surrounding faster-moving carrier droplets 250. Moreover, it was also demonstrated that the spray clouds 200, 210, when combined in this manner into cloud 220, had the same deposition characteristics as the coarse cloud projected from the XR8003VS nozzle 80. Additionally, the small drop component of the combined cloud 220 has a high KE, which is acquired from the larger carrier spray drops 250. Thus, the combination cloud 220 impacted the agricultural substrate more efficiently than the AI spray cloud 210 from the model XR800017 nozzle 80' alone. According to literature available from the Spraying Systems Company (hereafter "SSC"), the model number "XR8003VS" indicates a flat fan spray pattern similar in shape to a slice of pie having an angle spanning approximately "80" degrees that increases in width as a function of distance from the orifice of the nozzle 80, and that delivers "03" tenths of a gallon per minute at 40 PSI (276 kiloPascals also referred to as "kPa"). Other active sprayer nozzles 80' have also been found compatible for use with embodiments of the present invention. Such other nozzles can also further reduce undesirable AI spray cloud 210 drift while also reducing the recommended label rate of the AI. In some configurations, reductions exceeded approximately half the indicated AI label rate. Such other active spray nozzles include, for example, the SSC TeeJet nozzles having model numbers XR800050 and XR800067, which were used in combination with the XR8003VS model carrier spray nozzle.

The various figures generally suggest that the active spray nozzle 80' and arm 130 trails behind the carrier spray nozzle 80 as the boom 50 and cart 20 are pulled along behind the tractor 10. However, the variations and embodiments of the present invention have been found to function as intended in configuration where the carrier spray nozzle 80 trails behind the active spray nozzle 80' and arm 130 as the boom 50 and cart 20 are pulled across a field. In the former configuration, as discussed in more detail elsewhere in this description, a small portion of the droplets 260' (FIG. 3) of the active spray cloud 210 that pass through carrier spray cloud 200 and are recaptured by the carrier spray cloud 200 because the cloud 200 has a component of forward velocity that is induced by the forward motion of boom 50. In contrast, a potential disadvantage of the latter configuration where the active spray nozzle 80' leads the carrier spray nozzle 80, the overshot active spray droplets 260' that have passed completely through the cloud 200 will not be recaptured. This is because the carrier spray cloud 200 in this variation is moving away from the unentrained droplets 260' (FIG. 3). Although many of the unentrained droplets 260' may drift away from the intended target substrate, many may find their target and will not be lost. In either circumstance, the potential loss is insignificant since the majority of the active spray droplets 260 have been entrained in the airflow of combined spray cloud 220. Accordingly, it can be appreciated that three or more nozzles can be employed for applications requiring the mixture of more than two active ingredients, carrier sprays, and/or adjuvants. In an alternative variation, in addition to active ingredients being sprayed from the active nozzles, an active ingredient can also be added to the carrier fluid before projection from the carrier nozzle. With the immediately preceding variations in mind, it will also be understood by those with skill in the art that the present invention also contemplates a configuration that includes a carrier spray nozzle such as nozzle 80, as well as leading and trailing active spray nozzles, such as multiple nozzles similar in configuration and arrangement to active spray nozzle 80'. In further variations, side positioned nozzles and asymmetrically positioned nozzles, similar to nozzles 80, 80' may also be incorporated into sprayer assembly 60 in addition to the leading and trailing nozzles, thereby accommodating multiple nozzle configurations. See, for example, FIGS. 5 and 6, which are discussed in more detail below.

In operation, as will be apparent to those with skill in the art from reference to the accompanying figures and the preceding discussion, the sprayer 60 constructed in accordance with the principles of the present invention will form a combined spray cloud 220 wherein the droplets 260 of the AI spray cloud 210 have a droplet size spectra that is smaller than that of the carrier spray cloud 200. During the process of combination, one or more of the smaller droplets 260 become entrained in the airflow behind the larger carrier droplets 250 without coalescence. Although some coalescence of the smaller droplets 260 with each other and the larger droplets 250 is unavoidable, generally, the majority of the smaller droplets 260 do not coalesce with the larger droplets 250. Instead, it has been discovered that the smaller droplets 260 are accelerated by the air flow surrounding the larger droplets 250 such that they become entrained in the air flow immediately behind the faster-moving larger droplets 260 that are falling towards the agricultural target substrate. As has been previously described in the prior art, the larger carrier droplets impact the target substrate and disperse, leaving minimal carrier fluid residue behind on the substrate. The larger droplets disperse on impact because the force of impact overcomes the surface tension of the carrier fluid, which is proportional to the corresponding KE of the droplet. The smaller droplet(s) that follow, also impact the target substrate, but do not disperse. This is due in part to the fact that force of impact of the smaller droplets does not overcome the surface tension of the active fluid since the mass, and the corresponding KE, of the smaller droplet is less than that of the larger droplet. Thus, the KE of the active fluid droplet is small enough so that the force on impact, which is equal to the mass of the droplet times the decelerative force of impact, is less than the surface tension of the active ingredient fluid of the smaller droplet.

In a variation of the preceding embodiments, the carrier fluid is water, which may also include an adjuvant. The carrier fluid may alternatively contain another AI and/or the AI contained also contained in the active spray. Any of these variations may include such substances at either the same or different concentrations as that of the AI in the active spray.

Active ingredients typically include, for example but not for purposes of limitation, biologically and/or chemically active biologicals, biorationals, and substances such as agrochemicals that include, for purposes of example without limitation, herbicides, insecticides, fungicides, and their safeners, and other biocides including biological pesticides, plant growth regulators, and bactericides, and including such pest control agents such as fungi, bacteria, viruses, and pheromones and/or other semiochemicals that disrupt populations rather than kill individual organisms, and/or any mixture of the preceding items. These substances can be used with or without adjuvant(s), as a mixture of at least two or more elements of the preceding group. The present invention also contemplates that the preceding variations can be modified so that the volumetric flow rate and spray patterns are adjustable through use of adjustable nozzles. That is, nozzles can be used that are either interchangeable with other nozzles or that are adjustable, or both, with respect to flow rate, spray pattern configuration, and with respect to compatibility with various viscosity and compositions of carrier and AI fluids and fluid pressures. Further, a single nozzle is also contemplated by the present invention, which is configured to incorporate integral, multiple sprayers that can accomplish the above-described combination of spray clouds 200, 210 into combined cloud 220. Also, the spray clouds may be adjusted, by use of various fluid additives that can adjust the amount by which the active spray droplets 260 coalesce or do not coalesce with the carrier spray droplets 250.

In another variation of the preceding embodiment, the respective nozzle spray clouds or patterns 200, 210, 220 are adjusted so that the active spray droplets 260 are entrained in the airflow behind the larger carrier spray droplets 250 at distance whereby the active spray droplets 260 continuously impact the target substrate canopy of the agricultural target or product as the larger carrier droplets 250 impact and disperse. In this manner, the entrained active spray droplets 260 are thereby deposited on the target substrate with the same deposition characteristics as those of the carrier spray droplets. In this manner, the entrained active spray droplets 260 are thereby deposited on the target substrate.

In a different variation of the preceding variations, the sprayer 60 further incorporates at least one additional nozzle, such as that described below in more detail in connection with FIGS. 5 and 6, which is adapted to project an additional spray cloud, similar to clouds 200, 210, 220, that intersects and combines with either or any of the carrier cloud 200, the AI cloud 210, or the combined cloud 220, wherein the droplets of the additional cloud become entrained in the air flow behind either the carrier droplets 250, or the AI droplets 260, or both, and whereby the majority of the additional spray droplets do not coalesce with the droplets 250, 260.

Another preferred embodiment of the present invention is directed to a multiple nozzle sprayer, such as sprayer 60, that incorporates a swing bracket assembly, or a sprayer bracket assembly, such as assembly 100, that includes a mounting bracket, such as bracket 110, that is adjustably attached by at least one pivot pin to an outwardly projecting angle arm, such as arm 130. The mounting bracket is further formed to have with a mounting pad such as mounting pad 150, for mounting to a sprayer boom member such as boom 50. The mounting bracket and the angle arm each are formed with at least one nozzle mounting portion, such as portions 160, 170. The multiple nozzle sprayer is configured with carrier and active spray nozzle assemblies, such as nozzle assemblies 70, 70', that are mounted to the nozzle portions and configured to project respective intersecting spray clouds, such as spray clouds 200, 210, that combine to form a cloud such as combined cloud 220. Further, the carrier spray nozzle cloud has a droplet size spectra that exceeds that of the active spray nozzle cloud.

An embodiment of a multiple nozzle sprayer 60 is also practiced according to present invention that includes a swing bracket assembly, or sprayer bracket assembly, 100 that has a mounting bracket 110 adjustably attached by at least one pivot pin 120 to an outwardly projecting angle arm 130, the mounting bracket 110 formed with a mounting pad 150 and the mounting bracket 110 and the angle arm 130 each formed with at least one respective nozzle mounting portion 160, 170. This variation of the preceding embodiments is further configured with first and second nozzles 80, 80' having respective and intersecting spray clouds 200, 210, wherein the second nozzle 80' spray cloud 210 is configured with a droplet 260 having a size spectra that is less than that of the droplets 250 projected from the first spray nozzle 80.

Another preferred variation of the preceding embodiments is directed to a multiple nozzle sprayer assembly 60 that is adapted with a swing bracket assembly, or sprayer bracket assembly, 100 that includes a mounting bracket 110 adjustably attached by at least one pivot pin 140 to an outwardly projecting angle arm 130. The mounting bracket 110 is formed with a mounting pad 150 and the mounting bracket 110 and the angle arm 130 are each formed with at least one respective nozzle mounting portion 160, 170. Also included are means, such as assembly 100 that incorporates slide plates, not shown but known to the art, that slidably and adjustably mount the nozzle sprayer assemblies 70, 70' to respective mounting portions 160, 170. In this variation, a medium to coarse nozzle sprayer assembly, such as, for example, nozzle sprayer assembly 80, is carried from the mounting means and projects a spray cloud, such as spray cloud 200, with a generally vertical direction. A fine nozzle sprayer, such as sprayer 80', is also mounted on the other mounting means, and which projects a spray cloud, such as spray cloud 210, at an angle to intersect with and combine with the spray cloud of the coarse spray nozzle.

A multiple nozzle sprayer assembly of a variation of the preceding embodiments includes means for adjustably mounting sprayer nozzles. This variation includes a swing bracket assembly, or a sprayer bracket assembly, 100 that has a mounting bracket 110 adjustably attached by at least one pivot pin 140 to an outwardly projecting angle arm 130. The mounting bracket 110 is formed with a mounting pad 150 that is adapted for attachment to the boom 50. The mounting bracket 110 and the angle arm 130 are each formed with at least one respective nozzle mounting portion 160, 170. This variation also includes a coarse spray nozzle assembly 70 movably carried from the mounting means, such as assembly 100, and having a spray cloud 200 with a generally vertical direction. Also, a fine spray nozzle assembly 70' is adjustably mounted to the mounting means, such as assembly 100, and projects a spray cloud 210 that intersects and combines with that of the coarse spray nozzle assembly 70. The droplet size spectra and velocity profile of the fine spray cloud 210 droplets 260 are further configured to intersect and combine with the coarse spray cloud 200 by becoming entrained in the air flow behind the droplets 250 of the coarse spray cloud 200 without coalescing.

The present invention further contemplates a spray carrier, such as cart 20, for applying an optimized amount of an active spray to agricultural products. The carrier includes a spray nozzle support, such as a device similar to boom 50, that includes means for mounting a multiple sprayer assembly 60 that includes a swing bracket assembly, or a sprayer bracket assembly, 100 with a mounting bracket 110 adjustably attached by at least one pivot pin 140 to an outwardly projecting angle arm 130. The mounting bracket 110 is formed with a mounting pad 150 and both the mounting bracket 110 and the angle arm 130 each formed with at least one respective nozzle mounting portion 160, 170. The preceding embodiment also includes carrier and active spray nozzle assemblies, 70 and 70', respectively, each configured to project intersecting respective spray clouds 200, 210 to form a combined spray cloud 220.

In a variation of the preceding embodiment, the active spray nozzle assembly 70' projects a spray cloud 210 with droplets 260 that are smaller than those projected by the carrier spray nozzle assembly 70 such that the active spray droplets 260 become entrained in the air flow behind the carrier spray droplets 260. In another variation, the majority of the active spray droplets 260 do not coalesce with the carrier spray droplets 250.

Another variation of the preceding embodiments of the present invention includes a device, such as sprayers 60 for spraying the target with a plurality of sprays 220, which includes a nozzle device 60 incorporating first and second sprayer assemblies 70, 70' adapted to spray intersecting and combining spray patterns of respective carrier and active spray clouds 200, 210. The nozzle device 60 is configured with a swing bracket assembly, or a sprayer bracket assembly, 100 including a mounting bracket 110 adjustably attached by at least one pivot pin 140 to an outwardly projecting angle arm 130. The mounting bracket 110 is constructed according to preceding variations of the preferred embodiment. Also as in preceding variations of the earlier embodiments, the first sprayer assembly 70 projects a carrier cloud 200 that has a droplet 250 size spectra greater than the droplet 260 size spectra of the active sprayer assembly 70' whereby the smaller droplets 250 of the active spray cloud 200 become entrained in the air flow behind the carrier spray cloud 200 droplets 250.

A system for spraying a target region is contemplated by the present invention and includes a spray cart, such as cart 20, that has a supply of a carrier fluid 30, and a supply of an active ingredient 40, both of which are connected to a pressurizing source, such fluid pumps 300, that supply pressurized fluid to a boom assembly, such as boom 50, configured with at least one swing bracket assembly, or sprayer bracket assembly, 100. The swing bracket assembly 100 is configured as described in preceding embodiments and variations.

Preferred embodiments of the present invention are also directed to a method for combining an active spray with a carrier spray. A step of the method includes selecting a swing bracket assembly, or a fixed sprayer bracket assembly, such as swing bracket assembly 100 described previously. In another step, coarse and fine spray nozzles are selected, such those described above, which are carried from the swing bracket assembly, or sprayer bracket assembly, 100. As before they are configured to project intersecting spray clouds 200, 210 that combine into an application spray cloud 220. The method further includes supplying the coarse spray nozzle with a carrier fluid and the fine spray nozzle with an active fluid and applying the combined spray cloud to a desired target such as an agricultural product or substrate.

Referring next to FIGS. 5 & 6, an additional embodiment of a multiple nozzle sprayer 60'is shown that includes a plurality of nozzle assemblies 70, 70', 70" that are arranged similar to previous embodiments. Here, multiple active, intersecting spray clouds 210, 210' are configured to form a combined spray cloud 220'. This exemplary embodiment includes most of the features of preceding embodiments as indicated by identical reference numerals. However, a variation of the bracket assembly, or sprayer bracket assembly, 100' includes a similarly configured, first outwardly projecting angle arm 130' and a second outwardly projecting angle arm 130". Although only two angle arms are shown in FIG. 5, the present embodiment contemplates additional such angle arms for additional nozzles, as well as modified arms that can be adapted to mount a plurality of nozzles similar to nozzle assemblies 70, 70', 70", which can be arranged to project spray clouds that intersect and combine with the spray clouds identified by references numerals 200, 210, 210'.

The multiple nozzle sprayer 60' further includes a second angle arm 130" (FIG. 5) that further incorporates a nozzle 80", configured with an orifice 82", and a nozzle feed support assembly 90" having supply hose fittings 95". The additional AI nozzle feed support assembly 90" is mounted to the nozzle mount portion 170' of the second angle arm 130". The second angle arm may be integrally formed with angle arm 130' or may be separately mounted to modified mounting bracket 110'. Each angle arm may be fixedly or rigidly mounted to the mounting bracket 110' or may be configured to be adjustably mounted such that angles θ and θ' may be independently adjustable. Additionally, the angle arms may be fixedly or releasably mounted to bracket 110' by use of removable pins 140 and holes 145'. Pins 140 may be any type of suitable fasteners including bolts and nuts, and other types of permanent and releasable devices. All of the combinations described in detail in connection with the other embodiments and variations described herein are also equally suitable for implementation with the instant embodiment. The active ingredient nozzles 80', 80" may be positioned relative to nozzle 80 as described in connection with other embodiments such that distances X, X', Y, Y' and angles θ and θ' are selected to be similar to parameters described to be effective for the double nozzle sprayer 60. As can be observed with continued reference to FIG. 5, active spray droplets 260, 260' mix with and become entrained with the larger and faster-moving carrier spray droplets 250 to form combined spray cloud 220'. The majority of the individual droplets 270' of the combined spray cloud 220' are a mixture of active spray droplets 260 and 260'.

The additional active spray cloud 210', as illustrated in part in FIGS. 5 and 6, is configured similarly to active spray cloud 210 in that it has a centerline AS' that is arranged to have an angle θ' offset from the generally vertical centerline CS of the carrier spray. Although the centerline CS is shown generally vertical, it may also be offset by a desired angle from the generally vertical direction. As discussed in the context of other embodiments and variations, the recapture of active spray droplets 260, 260' that pass completely through and spray cloud 200 proximate to the arrows designated RE and RE' (FIGS. 5 & 6) occurs as a result of the two mechanisms already described. First, the carrier spray cloud 200 will recapture some of the droplets as cloud 200 traverses. The drafting or flow field effect of the ambient air will operate to recapture many additional droplets. The physical configuration of additional active spray cloud 210' is dependent upon the type of nozzle and orifice formed in the nozzle assembly 70", and it includes sheet spray region AS1', transition region AS2', and atomized region AS3'.

In additional variations to the preceding embodiments, the carrier nozzle 80 may be supplied with a carrier fluid that also contains one or more of the AI fluids already described whereby the multiple AIs may be imparted into the carrier cloud 200 and the combined cloud 220. In this manner, multiple AIs may be applied to the target substrate with a minimum number of multiple nozzles. Similarly, more than one AI may be combined into the active fluid supply projected from active nozzles 80', 80", either alone or in conjunction with any of the embodiments and variations described herein to accomplish similar purposes. In further modifications, the physical arrangement of the carrier nozzle 80 and the active nozzles 80', 80" may switched such that, for example without limitation, carrier nozzle 80 is positioned where active nozzle(s) 80' and/or 80" are shown in the various figures. Also, more than one carrier nozzle, each having the same or different predetermined droplet size spectra and velocity profile, may be incorporated into the preceding embodiments to achieve a variety of desired results.

The multiple sprayer assembly and method for use of the present invention overcomes many of the shortcomings of the prior art technology by optimizing application of active substances to a target surface and by reducing the amount of active substances needed. In sum, the present invention demonstrates an effective and optimized device, system, and method that reduces the amount of AI needed to effectively treat an agricultural product with a biocidal substance. While preferred embodiments and variations of the invention have been illustrated and described in detail, it will be within the ability of one skilled in the sprayer nozzle arts to make modifications in the details of construction and application of the present invention, such as through the substitution of equivalent materials and parts and in changing the arrangement of parts, or the application of equivalent process steps, without departing from the spirit of the invention and the scope of the following claims.

What is claimed is:

1. A multiple nozzle sprayer, comprising:

a swing bracket assembly that includes a mounting bracket adjustably attached by at least one pivot pin to an outwardly projecting angle arm, the mounting bracket and the angle arm each formed with at least one nozzle mounting portion, the mounting bracket defining at least a first aperture and a second aperture;

the angle arm defining at least one aperture, the angle arm adapted to be pivoted relative to the mounting bracket between a stowed position and a spraying position;

a configuration pin adapted to be inserted through the first aperture of the mounting bracket and the at least one aperture of the angle arm when the angle arm is in the stowed position, the configuration pin adapted to be inserted through the second aperture of the mounting bracket and the at least one aperture of the angle arm when the angle arm is in the spraying position, the configuration pin adapted to be removed from the at least one aperture of the angle arm to enable the angle arm to move from the stowed position to the spraying position;

first and second nozzles mounted to the at least one nozzle mounting portion and configured to project respective intersecting spray clouds; and wherein the respective spray cloud from the first nozzle has a predetermined droplet size spectra that is greater than that of the second nozzle.

2. The multiple nozzle sprayer according to claim 1 wherein the angle arm is releasably and stowably attached to the mounting bracket.

3. The multiple nozzle sprayer according to claim 1 wherein the first nozzle is further configured to spray a cloud of a carrier fluid and the second nozzle is configured to spray an active fluid in a spray cloud that combines with the carrier fluid spray cloud.

4. The multiple nozzle sprayer according to claim 3 wherein the carrier fluid is comprised of water and the active fluid is selected from a group consisting of biologicals, biorationals, agrochemicals, herbicides, insecticides, fungicides, safeners, biological pesticides, plant growth regulators, bactericides, fungi, bacteria, viruses, pheromones, and a mixture of at least two elements of the group.

5. The multiple nozzle sprayer according to claim 3, wherein the majority of the respective droplets of each spray cloud do not coalesce with one another.

6. The multiple nozzle sprayer according to claim 3 wherein the droplets of the carrier spray cloud impact a target and disperse and wherein the majority of droplets of the active fluid that are entrained behind droplets of the carrier fluid impact and remain on target.

7. The multiple nozzle sprayer according to claim 3 that further includes at least one additional nozzle adapted to spray an additional cloud that intersects and combines with the carrier spray cloud and wherein droplets of the additional cloud become entrained in the air flow behind droplets of the carrier fluid and whereby the majority of the droplets of the additional cloud do not coalesce with the droplets of the carrier fluid.

8. The multiple nozzle sprayer according to claim 7 wherein the majority of the droplets of the additional cloud do not coalesce with the droplets of the active spray cloud.

9. The multiple nozzle sprayer according to claim 3 that further incorporates at least one additional nozzle adapted to spray an additional cloud that intersects and combines with the active spray cloud and wherein droplets of the additional cloud become entrained in the air flow behind droplets of the active spray cloud.

10. A device for spraying a target with a plurality of sprays, comprising:

a nozzle device incorporating first and second sprayers adapted to spray intersecting and combining spray patterns of respective carrier and active spray clouds;

the nozzle device configured with a swing bracket assembly including a mounting bracket adjustably attached by at least one pivot pin to an outwardly projecting angle arm, the mounting bracket and the angle arm each formed with at least one nozzle mounting portion, the mounting bracket defining at least a first aperture and a second aperture;

the angle arm defining at least one aperture, the angle arm adapted to be pivoted relative to the mounting bracket between a stowed position and a spraying position; and a configuration pin adapted to be inserted through the first aperture of the mounting bracket and the at least one aperture of the angle arm when the angle arm is in the stowed position, the configuration pin adapted to be inserted through the second aperture of the mounting bracket and the at least one aperture of the angle arm when the angle arm is in the spraying position, the configuration pin adapted to be removed from the at least one aperture of the angle arm to enable the angle arm to move from the stowed position to the spraying position;

wherein the first sprayer projects a carrier cloud having a droplet size spectra greater than that of the active sprayer whereby the smaller droplets of the active spray cloud become entrained in the air flow behind the carrier spray cloud droplets.

11. The device according to claim 10 wherein the majority of the active cloud droplets do not coalesce with the carrier cloud droplets during travel.

12. A multiple nozzle sprayer, comprising:

a pivotally configured swing bracket assembly having a mounting bracket releasably attached by at least one pin to an outwardly projecting angle arm, the mounting bracket and the angle arm each formed with at least one nozzle mounting portion, the mounting bracket defining at least a first aperture and a second aperture;

the angle arm defining at least one aperture, the angle arm adapted to be pivoted relative to the mounting bracket between a stowed position and a spraying position;

a configuration pin adapted to be inserted through the first aperture of the mounting bracket and the at least one aperture of the angle arm when the angle arm is in the stowed position, the configuration pin adapted to be inserted through the second aperture of the mounting bracket and the at least one aperture of the angle arm when the angle arm is in the spraying position, the configuration pin adapted to be removed from the at least one aperture of the angle arm to enable the angle arm to move from the stowed position to the spraying position;

first and second nozzles mounted to the nozzle mounting portions and configured to project respective intersecting spray clouds; and wherein the first nozzle spray cloud has a predetermined droplet size spectra that is greater than that of the second spray nozzle.

13. A sprayer boom, comprising:

a boom assembly configured with at least one swing bracket assembly;

the swing bracket assembly having a mounting bracket releasably attached by at least one pin to an outwardly projecting angle arm, the mounting bracket and the angle arm each formed with at least one nozzle mounting portion, the mounting bracket defining at least a first aperture and a second aperture;

the angle arm defining at least one aperture, the angle arm adapted to be pivoted relative to the mounting bracket between a stowed position and a spraying position;

a configuration pin adapted to be inserted through the first aperture of the mounting bracket and the at least one aperture of the angle arm when the angle arm is in the stowed position, the configuration pin adapted to be inserted through the second aperture of the mounting bracket and the at least one aperture of the angle arm when the angle arm is in the spraying position, the configuration pin adapted to be removed from the at least one aperture of the angle arm to enable the angle arm to move from the stowed position to the spraying position;

first and second nozzles mounted to the nozzle mounting portions and configured to project respective intersecting spray clouds; and wherein the first nozzle spray cloud has a predetermined droplet size spectra that is greater than that of the second spray nozzle.

14. A system for spraying a target region, comprising:

a supply of a carrier fluid and a supply of an active ingredient, both connected to a pressurizing source that supplies pressurized fluid to a boom assembly configured with at least one swing bracket assembly;

the swing bracket assembly having a mounting bracket releasably attached by at least one pin to an outwardly projecting angle arm, the mounting bracket and the angle arm each formed with at least one nozzle mounting portion, the mounting bracket defining at least a first aperture and a second aperture;

the angle arm defining at least one aperture, the angle arm adapted to be pivoted relative to the mounting bracket between a stowed position and a spraying position;

a configuration pin adapted to be inserted through the first aperture of the mounting bracket and the at least one aperture of the angle arm when the angle arm is in the stowed position, the configuration pin adapted to be inserted through the second aperture of the mounting bracket and the at least one aperture of the angle arm when the angle arm is in the spraying position, the configuration pin adapted to be removed from the at least one aperture of the angle arm to enable the angle arm to move from the stowed position to the spraying position;

first and second nozzles each connected to one of the pressurized supplies and mounted to the nozzle mounting portions and configured to project respective intersecting spray clouds; and wherein the first nozzle spray cloud has a predetermined droplet size spectra that is greater than that of the second spray nozzle.

15. A multiple nozzle sprayer, comprising:

a fixed bracket assembly that includes a mounting bracket rigidly mounted by a releasable pin to an outwardly projecting angle arm, the mounting bracket and the angle arm each formed with at least one nozzle mounting portion, the mounting bracket defining at least a first aperture and a second aperture;

the angle arm defining at least one aperture, the angle arm adapted to be placed in a stowed position and a spraying position;

a configuration pin adapted to be inserted through the first aperture of the mounting bracket and the at least one aperture of the angle arm when the angle arm is in the stowed position, the configuration pin adapted to be inserted through the second aperture of the mounting bracket and the at least one aperture of the angle arm when the angle arm is in the spraying position, the configuration pin adapted to be removed from the at least one aperture of the angle arm to enable the angle arm to be changed from the stowed position to the spraying position;

first and second nozzles mounted to the nozzle mounting portions and configured to project respective intersecting spray clouds; and wherein the first nozzle spray cloud has a predetermined droplet size spectra that is greater than that of the second spray nozzle.

16. The multiple nozzle sprayer according to claim 15 wherein the angle portion is releasably and stowably attached to the mounting bracket.

17. The multiple nozzle sprayer according to claim 15 wherein the first nozzle is further configured to spray a cloud of a carrier fluid and the second nozzle is configured to spray an active fluid in a spray cloud that combines with the carrier fluid spray cloud.

18. The multiple nozzle sprayer according to claim 17 wherein the carrier fluid is comprised of water and the active fluid is selected from a group consisting of biologicals, biorationals, agrochemicals, herbicides, insecticides, fungicides, safeners, biological pesticides, plant growth regulators, bactericides, fungi, bacteria, viruses, pheromones, and a mixture of at least two elements of the group.

19. The multiple nozzle sprayer according to claim 17, wherein the majority of the respective droplets of each spray cloud do not coalesce with one another.

20. The multiple nozzle sprayer according to claim 15 wherein the droplets of the carrier spray cloud impact a target and disperse and wherein the majority of the active spray droplets that are entrained behind the carrier droplets impact and remain on the target.

21. The multiple nozzle sprayer according to claim 15 that further includes at least one additional nozzle adapted to spray an additional cloud that intersects and combines with the carrier cloud and wherein the droplets of the additional cloud become entrained in the air flow behind the carrier droplets and whereby the majority of the additional spray droplets do not coalesce with the carrier droplets.

22. The multiple nozzle sprayer according to claim 21 wherein the majority of the droplets of the additional cloud do not coalesce with the droplets of the active spray cloud.

23. The multiple nozzle sprayer according to claim 15 that further incorporates at least one additional nozzle adapted to spray an additional cloud that intersects and combines with the active cloud and wherein the droplets of the additional cloud become entrained in the air flow behind the droplets of the active cloud.

* * * * *